US012271151B2

(12) United States Patent
Abe et al.

(10) Patent No.: US 12,271,151 B2
(45) Date of Patent: Apr. 8, 2025

(54) TONER AND METHOD FOR MANUFACTURING TONER

(71) Applicant: CANON KABUSHIKI KAISHA, Tokyo (JP)

(72) Inventors: Yukihiro Abe, Chiba (JP); Takeshi Hashimoto, Ibaraki (JP); Kazuki Murata, Tokyo (JP); Miki Ueda, Tokyo (JP); Hayato Ida, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 587 days.

(21) Appl. No.: 17/654,461

(22) Filed: Mar. 11, 2022

(65) Prior Publication Data

US 2022/0299902 A1  Sep. 22, 2022

(30) Foreign Application Priority Data

Mar. 19, 2021  (JP) ................. 2021-045545

(51) Int. Cl.
*G03G 9/08* (2006.01)
*C08F 220/18* (2006.01)
*C08G 63/16* (2006.01)
*C08G 63/21* (2006.01)
*G03G 9/087* (2006.01)
*G03G 9/097* (2006.01)

(52) U.S. Cl.
CPC .... *G03G 9/08711* (2013.01); *C08F 220/1818* (2020.02); *C08G 63/16* (2013.01); *C08G 63/21* (2013.01); *G03G 9/081* (2013.01); *G03G 9/0819* (2013.01); *G03G 9/0821* (2013.01); *G03G 9/0825* (2013.01); *G03G 9/08755* (2013.01); *G03G 9/09733* (2013.01)

(58) Field of Classification Search
CPC .. G03G 9/08711; G03G 9/081; G03G 9/0819; G03G 9/0821; G03G 9/08755; G03G 9/09733; C08F 220/1818; C08G 63/16; C08G 63/21
See application file for complete search history.

(56) References Cited

U.S. PATENT DOCUMENTS

| | | |
|---|---|---|
| 9,057,970 B2 | 6/2015 | Ida et al. |
| 9,152,088 B1 | 10/2015 | Kobori et al. |
| 9,348,247 B2 | 5/2016 | Ida et al. |
| 9,348,253 B2 | 5/2016 | Kanno et al. |
| 9,417,540 B2 | 8/2016 | Hashimoto et al. |
| 9,436,112 B2 | 9/2016 | Iwasaki et al. |
| 9,540,483 B2 | 1/2017 | Ida et al. |
| 9,575,426 B2 * | 2/2017 | Shimano ............ G03G 9/09371 |
| 9,651,883 B2 | 5/2017 | Hama et al. |
| 9,665,026 B2 | 5/2017 | Iwasaki et al. |
| 9,696,644 B2 | 7/2017 | Ida et al. |
| 9,897,934 B2 | 2/2018 | Tamura et al. |
| 10,012,920 B2 | 7/2018 | Shibata et al. |
| 10,036,970 B2 | 7/2018 | Kanno et al. |
| 10,078,281 B2 | 9/2018 | Ida et al. |
| 10,082,743 B2 | 9/2018 | Hama et al. |
| 10,088,765 B2 | 10/2018 | Miyakai et al. |
| 10,146,146 B2 | 12/2018 | Komatsu et al. |
| 10,175,595 B2 | 1/2019 | Onozaki et al. |
| 10,197,936 B2 | 2/2019 | Onozaki et al. |
| 10,203,619 B2 | 2/2019 | Yamashita et al. |
| 10,228,629 B2 | 3/2019 | Tamura et al. |
| 10,274,851 B2 | 4/2019 | Hashimoto et al. |
| 10,353,312 B2 | 7/2019 | Kamae et al. |
| 10,401,748 B2 | 9/2019 | Hashimoto et al. |
| 10,423,086 B2 | 9/2019 | Hama et al. |
| 10,451,986 B2 | 10/2019 | Sano et al. |
| 10,451,990 B2 | 10/2019 | Kamae et al. |
| 10,474,049 B2 | 11/2019 | Onozaki et al. |
| 10,514,624 B2 | 12/2019 | Tamura et al. |
| 10,564,560 B2 | 2/2020 | Onozaki et al. |
| 10,599,060 B2 | 3/2020 | Kanno et al. |
| 10,656,545 B2 | 5/2020 | Kamae et al. |

(Continued)

FOREIGN PATENT DOCUMENTS

| | | |
|---|---|---|
| JP | 2014-48576 A | 3/2014 |
| JP | 2014-59489 A | 4/2014 |

(Continued)

OTHER PUBLICATIONS

U.S. Appl. No. 17/457,766, filed Dec. 6, 2021, Yuya Chimoto.
U.S. Appl. No. 17/457,822, filed Dec. 6, 2021, Hisasuke Kajihara.
U.S. Appl. No. 17/536,853, filed Nov. 29, 2021, Hisasuke Kajihara.
U.S. Appl. No. 17/542,006, filed Dec. 3, 2021, Masaharu Miura.
U.S. Appl. No. 17/648,330, filed Jan. 19, 2022, Hiroki Watanabe.
U.S. Appl. No. 17/648,333, filed Jan. 19, 2022, Ichiro Kanno.
U.S. Appl. No. 17/648,368, filed Jan. 19, 2022, Ichiro Kanno.
U.S. Appl. No. 17/654,481, filed Mar. 11, 2022, Kazuki Murata.
U.S. Appl. No. 17/656,282, filed Mar. 24, 2022, Takeshi Hashimoto.
U.S. Appl. No. 17/659,084, filed Apr. 13, 2022, Kouichirou Ochi.
U.S. Appl. No. 17/663,935, filed May 18, 2022, Miki Ueda.

(Continued)

*Primary Examiner* — Peter L Vajda
*Assistant Examiner* — Jenna Kuipers
(74) *Attorney, Agent, or Firm* — VENABLE LLP

(57) ABSTRACT

A toner comprising a toner particle comprising a binder resin and a release agent, wherein the binder resin comprises a first resin and a second resin; the first resin is a crystalline resin having a melting point Tp of 50° C. to 90° C.; the second resin is an amorphous resin; in a cross section of the toner particle observed by a transmission electron microscope, the cross section of the toner particle has a matrix-domain structure composed of a matrix comprising the first resin and domains comprising the second resin; an area ratio of the matrix comprising the first resin in a total area of the cross section of the toner particle is 35 to 70 area %; and where a longest direction of each of the domains is taken as a longitudinal direction, a standard deviation of an angle of the longitudinal direction of the domains is 25° or less.

10 Claims, No Drawings

(56) References Cited

U.S. PATENT DOCUMENTS

| | | |
|---|---|---|
| 10,775,710 B1 | 9/2020 | Kamae et al. |
| 10,859,931 B2 | 12/2020 | Hashimoto et al. |
| 10,877,386 B2 | 12/2020 | Murayama et al. |
| 10,969,705 B2 | 4/2021 | Shirayama et al. |
| 11,029,617 B2 | 6/2021 | Chimoto et al. |
| 11,131,939 B2 | 9/2021 | Hama et al. |
| 11,181,848 B2 | 11/2021 | Ochi et al. |
| 2011/0136060 A1 | 6/2011 | Fujikawa |
| 2013/0108955 A1 | 5/2013 | Shibata et al. |
| 2013/0288173 A1 | 10/2013 | Hashimoto et al. |
| 2014/0308611 A1 | 10/2014 | Shimano |
| 2014/0329176 A1 | 11/2014 | Kanno et al. |
| 2015/0099227 A1 | 4/2015 | Ida et al. |
| 2016/0109820 A1 | 4/2016 | Hashimoto et al. |
| 2018/0314176 A1 | 11/2018 | Ikeda et al. |
| 2020/0233327 A1 | 7/2020 | Honda et al. |
| 2021/0141315 A1 | 5/2021 | Kamae et al. |
| 2021/0181647 A1 | 6/2021 | Hashimoto et al. |
| 2021/0181649 A1 | 6/2021 | Kanno et al. |
| 2021/0181650 A1 | 6/2021 | Hama et al. |
| 2021/0181651 A1 | 6/2021 | Kanno et al. |
| 2021/0278774 A1 | 9/2021 | Hashimoto et al. |
| 2021/0278775 A1 | 9/2021 | Kamae et al. |
| 2021/0302853 A1 | 9/2021 | Murata et al. |
| 2021/0302854 A1 | 9/2021 | Kitamura et al. |
| 2022/0050398 A1 | 2/2022 | Ooyama et al. |

FOREIGN PATENT DOCUMENTS

| | | |
|---|---|---|
| JP | 2014-142632 A | 8/2014 |
| JP | 2019-214706 A | 12/2019 |
| JP | 2019-219641 A | 12/2019 |
| JP | 2019-219643 A | 12/2019 |
| JP | 2019-219645 A | 12/2019 |
| JP | 2022-093277 A | 6/2022 |
| WO | 2019/073731 A1 | 4/2019 |

OTHER PUBLICATIONS

U.S. Appl. No. 17/664,102, filed May 19, 2022, Megumi Shino.
Fedors, A Method for Estimating Both the Solubility Parameters and Molar Volumes of Liquids, Polym. Eng. Sci., vol. 14, No. 2 (1974) 147-54.

\* cited by examiner

TONER AND METHOD FOR MANUFACTURING TONER

BACKGROUND OF THE INVENTION

Field of the Invention

The present disclosure relates to a toner to be used in an electrophotographic method, an electrostatic recording method, an electrostatic printing method, and a toner jet method, and also relates to a method for manufacturing the toner.

Description of the Related Art

As electrophotographic full color copiers have proliferated in recent years, there has been increased demand for higher printer speeds and greater energy savings. To achieve high-speed printing, techniques have been studied for melting the toner more rapidly in the fixing step. Techniques have also been studied for reducing the various control times within jobs and between jobs in order to increase productivity. As strategies for saving energy, techniques have been studied for fixing the toner at a lower temperature in order to reduce the energy expenditure in the fixing step.

It is known that a toner with a crystalline resin having a sharp melt property as the main component has excellent low-temperature fixability as compared with a toner with an amorphous resin as the main component. For example, Japanese Patent Application Publication No. 2014-059489 describes a toner in which a domain-matrix structure having a matrix including a crystalline resin and domains including an amorphous resin and a colorant is formed and a domain diameter and a storage elastic modulus are set within a predetermined range. As a result, a toner having excellent fixing performance, image density and image glossiness can be obtained.

Further, Japanese Patent Application Publication No. 2014-142632 describes a toner in which a domain-matrix structure having a matrix including a crystalline resin with a predetermined melting point range and domains including an amorphous resin is formed. As a result, a toner that can be fixed with low energy and that can yield an image that is resistant to external forces such as rubbing and scratching can be obtained.

SUMMARY OF THE INVENTION

The toners described in the abovementioned documents have a domain-matrix structure, and a crystalline resin having a sharp melt property forms a matrix, so that the toners have excellent fixing performance at low energy. Meanwhile, it was found that under certain conditions, the transfer of a release agent to the image surface may be insufficient at the time of fixing, and fixing separability may be deteriorated. The present disclosure is aimed at a toner that can achieve both low-temperature fixability and fixing separability.

The present disclosure relates to a toner comprising a toner particle comprising
a binder resin and a release agent, wherein
the binder resin comprises a first resin and a second resin;
the first resin is a crystalline resin having a melting point Tp of 50° C. to 90° C.;
the second resin is an amorphous resin;
in a cross section of the toner particle observed by a transmission electron microscope,
the cross section of the toner particle has a matrix-domain structure composed of a matrix comprising the first resin and domains comprising the second resin;
an area ratio of the matrix in a total area of the cross section of the toner particle is 35 to 70 area %; and
where a longest direction of each of the domains is taken as a longitudinal direction, a standard deviation of an angle of the longitudinal direction of the domains is 25° or less.

The present disclosure can provide a toner that can achieve both low-temperature fixability and fixing separability. Further features of the present invention will become apparent from the following description of exemplary embodiments.

DESCRIPTION OF THE EMBODIMENTS

Unless otherwise specified, descriptions of numerical ranges such as "from XX to YY" or "XX to YY" in the present disclosure include the numbers at the upper and lower limits of the range. In the present disclosure, a (meth)acrylic acid ester means an acrylic acid ester and/or a methacrylic acid ester. When numerical ranges are described in stages, the upper and lower limits of each of each numerical range may be combined arbitrarily. The term "monomer unit" describes a reacted form of a monomeric material in a polymer. For example, one carbon-carbon bonded section in a principal chain of polymerized vinyl monomers in a polymer is given as one unit. A vinyl monomer can be represented by the following formula (Z):

in formula (Z), $R_{Z1}$ represents a hydrogen atom or alkyl group (preferably a $C_{1-3}$ alkyl group, or more preferably a methyl group), and $R_{Z2}$ represents any substituent. A crystalline resin is a resin exhibiting a clear endothermic peak in differential scanning calorimetry (DSC) measurement.

The present disclosure relates to a toner comprising a toner particle comprising
a binder resin and a release agent, wherein
the binder resin comprises a first resin and a second resin;
the first resin is a crystalline resin having a melting point Tp of 50° C. to 90° C.;
the second resin is an amorphous resin;
in a cross section of the toner particle observed by a transmission electron microscope,
the cross section of the toner particle has a matrix-domain structure composed of a matrix comprising the first resin and domains comprising the second resin;
an area ratio of the matrix in a total area of the cross section of the toner particle is 35 to 70 area %; and
where a longest direction of each of the domains is taken as a longitudinal direction, a standard deviation of an angle of the longitudinal direction of the domains is 25° or less.

As a result of diligent studies by the present inventors, it was found that the abovementioned problem can be resolved by forming a domain-matrix structure composed of a matrix including a first resin which is a crystalline resin having a predetermined melting point and domains including a second resin which is an amorphous resin, and controlling the area occupied by the first resin in the cross section of a toner particle and the orientation state of the domains.

The present inventors speculate that the reason for resolving the above problem is as follows. First, excellent low-temperature fixability can be obtained by using a crystalline resin having a melting point Tp of from 50° C. to 90° C. that has excellent sharp melt property at low energy, and forming a matrix-domain structure composed of a matrix including a first resin and domains including a second resin. Where the domain-matrix structure is not present and the first resin and the second resin are compatible with each other and form a uniform structure, the fixing separability tends to decrease. Further, the sharp melt property of the crystalline resin is likely to be lost, and the low-temperature fixability is likely to decrease. The melting point Tp is preferably from 55° C. to 70° C.

Meanwhile, for good fixing separability, it is important that the release agent dispersed in the toner particle at the time of fixing moves to the toner particle surface and intervenes between a toner image surface and a fixing roller. It is conceivable that in a toner having a matrix-domain structure composed of a matrix including a first resin which is a crystalline resin and domains which are an amorphous resin, the release agent moves to the toner particle surface through the matrix including the first resin at the time of fixing.

Therefore, it is conceivable that where the orientation of the domains including the second resin is irregular, the transfer of the release agent to the toner particle surface is hindered. Therefore, it is considered that the transfer of the release agent to the toner particle surface at the time of fixing can be promoted by aligning the orientation of the domains including the second resin. As a result of the examination, it was found that the transfer of the release agent to the toner particle surface can be promoted and good fixing separability can be obtained by setting the standard deviation of the angle of the longitudinal direction of domains to 25° or less. The standard deviation of the angle of the longitudinal direction of domains is preferably 22° or less. The lower limit is not particularly limited, but is preferably 1° or more, more preferably 5° or more, and further preferably 10° or more.

Such an effect can be obtained in the range where the area ratio of the matrix in the total area of the toner particle cross section is from 35 area % to 70 area %. When the ratio of the matrix is less than 35 area %, the above-mentioned matrix-domain structure may be reversed, a matrix-domain structure composed of a matrix including the second resin and domains including the first resin may be formed, and the low-temperature fixability is reduced. Meanwhile, when the ratio of the matrix exceeds 70 area %, the viscosity of the matrix including the melted first resin tends to decrease and the fixing separability tends to decrease at the time of high-temperature fixing.

Further, the area ratio of the matrix in the total area of the toner particle cross section is preferably from 40 area % to 60 area %. As described above, since it is conceivable that the release agent moves to the toner particle surface through the matrix, where the ratio of the matrix is 60% or less, the density of the domains including the second resin becomes high, and the fixing separability tends to be improved. The ratio of the matrix in the total area of the toner particle cross section can be controlled by the loaded amounts of the first resin and second resin.

A softening temperature Tm of the second resin is preferably higher than the melting point Tp of the first resin by 10° C. or more. When the softening temperature Tm of the second resin approaches the melting point of the first resin, the difference in viscosity between the first resin and the second resin becomes smaller at the time of fixing. Therefore, it is conceivable that the release agent will also move toward the second resin that forms domain, and the transfer to the toner particle surface will be hindered.

Therefore, in order to facilitate the transfer of the release agent to the toner particle surface and improve the fixing separability, it is conceivable to make the softening temperature Tm of the second resin higher than the melting point Tp of the first resin by 10° C. or more so that the release agent could be easily transferred to the toner particle surface through the matrix including the first resin. The softening temperature Tm of the second resin can be controlled by the molecular weight etc. of the amorphous resin contained in the second resin. By increasing the molecular weight, the softening temperature Tm of the second resin can be increased. More preferably, the softening temperature Tm of the second resin is from Tp+20° C. to Tp+50° C.

An average length (average major axis) of the domains in the longitudinal direction in the cross-sectional observation of the toner particle is preferably from 20 nm to 500 nm. When the average major axis of the domains is 500 nm or less, the second resin is likely to melt even when the toner is fixed at a low temperature, and the fixing performance is improved. Meanwhile, at the time of high-temperature fixing, the viscosity of the matrix including the melted first resin is unlikely to be lowered, and the fixing separability is improved. Further, when the average major axis of the domains is 20 nm or more, the fixing separability becomes better, the sharp melt property of the crystalline resin is easily exhibited, and the low-temperature fixability becomes better. The average length of the domains in the longitudinal direction is more preferably from 80 nm to 430 nm.

The average major axis of the domains can be controlled by the composition of monomers constituting the crystalline resin, the composition of monomers constituting the amorphous resin, the production conditions of the toner particles, and the like. Examples of the method for controlling the average major axis of the domains include the relationship between SP values of the resins constituting the matrix and the domains, the kneading temperature and the screw rotation speed in the melt-kneading process, the stirring rotation speed in the agglomeration process, and the like. When the SP values of the resins of the matrix and the domains are close to each other, the compatibility between the matrix and the domains is increased, and the average major axis of the domains tends to be small. Further, when the screw rotation speed and the stirring rotation speed are increased, a shearing force acting on the resins becomes stronger, and the average major axis of the domains becomes smaller.

The ratio La/Lb of the length La of the domain in the longitudinal direction to the maximum length Lb in the direction perpendicular to the longitudinal direction is preferably 8.0 or less, and more preferably 5.5 or less. The lower limit is not particularly limited, but is preferably 1.1 or more, and more preferably 1.5 or more.

The state where the ratio La/Lb is large indicates that the surface area of the domain is wider than that of a sphere having the same volume, that is, the contact area between the matrix and the domain is wider. In other words, this is conceivably a state in which the matrix including the first resin and the domains including the second resin are in closer contact with each other. High effectiveness of the toner can be obtained when the matrix including the first resin and the domain including the second resin are functionally separated. Therefore, by setting the ratio La/Lb to 8.0 or less, the fixing separability is further improved. The ratio La/Lb can be controlled by adjusting the SP values of the first resin contained in the matrix and the second resin contained in the domains. By increasing the difference between the two SP values, the ratio La/Lb can be reduced.

The materials that can be used will be explained in detail below.

<First Resin>

A binder resin includes the first resin, and the first resin is a crystalline resin. A known crystalline resin can be used as the crystalline resin. Suitable examples include crystalline vinyl resins, crystalline polyester resins, crystalline polyurethane resins, and crystalline polyurea resins. Other examples include ethylene copolymers such as ethylene-vinyl acetate copolymer, ethylene-methyl acrylate copolymer, ethylene-ethyl acrylate copolymer, ethylene-butyl acrylate copolymer, ethylene-methyl methacrylate copolymer, ethylene-methacrylic acid copolymer, ethylene-acrylic acid copolymer, and the like.

From the viewpoint of low-temperature fixability, crystalline vinyl resins and crystalline polyester resins are preferable. Further, it may be a hybrid resin in which a vinyl resin and a polyester resin are bonded. The first resin preferably includes a vinyl resin, more preferably is a vinyl resin, and preferably has a first monomer unit represented by a following formula (1). The first resin is preferably a vinyl resin having a monomer unit represented by the following formula (1). A vinyl resin is a polymer or copolymer of a compound including a group having an ethylenically unsaturated bond such as a vinyl group. Examples of the group having an ethylenically unsaturated bond include a vinyl group, a (meth)allyl group, and a (meth)acryloyl group.

The content ratio of the first monomer unit in the first resin is preferably from 30.0% by mass to 90.0% by mass, and more preferably from 45.0% by mass to 75.0% by mass. The weight average molecular weight (Mw) of the first resin is preferably from 5000 to 100000, and more preferably from 15000 to 50000.

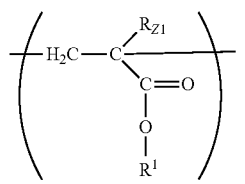

(1)

In the formula (1), $R_{Z1}$ represents a hydrogen atom or a methyl group, and $R^1$ represents an alkyl group having from 18 to 36 carbon atoms. The first monomer unit represented by the formula (1) has an alkyl group having from 18 to 36 carbon atoms and represented by $R^1$ in the side chain, and the presence of this portion facilitates the development of crystallinity. The first monomer unit represented by the formula (1) is preferably a monomer unit derived from at least one first polymerizable monomer selected from the group consisting of (meth)acrylic acid esters having an alkyl group having from 18 to 36 carbon atoms.

Examples of (meth)acrylic acid esters each having a $C_{18-36}$ alkyl group include (meth)acrylic acid esters each having a $C_{18-36}$ straight-chain alkyl group [stearyl (meth)acrylate, nonadecyl (meth)acrylate, eicosyl (meth)acrylate, heneicosanyl (meth)acrylate, behenyl (meth)acrylate, lignoceryl (meth)acrylate, ceryl (meth)acrylate, octacosyl (meth)acrylate, myricyl (meth)acrylate, dotriacontyl (meth)acrylate, etc.] and (meth)acrylic acid esters each having a $C_{18-36}$ branched alkyl group [2-decyltetradecyl (meth)acrylate, etc.].

Of these, from the viewpoint of low-temperature fixability, at least one selected from the group consisting of (meth)acrylic acid esters having a linear alkyl group having from 18 to 36 carbon atoms is preferable, at least one selected from the group consisting of (meth)acrylic acid esters having a linear alkyl group having from 18 to 30 carbon atoms is more preferable, and at least one selected from the group consisting of a linear stearyl (meth)acrylate and behenyl (meth)acrylate is even more preferable. As the monomer forming the first monomer unit, one type may be used alone, or two or more types may be used in combination.

Where the SP value $(J/cm^3)^{0.5}$ of the first monomer unit is denoted by $SP_1$, the $SP_1$ is preferably less than 20.00, more preferably 19.00 or less, and more preferably 18.40 or less. The lower limit is not particularly limited but is preferably 17.00 or more.

Here, the SP value is an abbreviation for the solubility parameter and is an index of solubility. The calculation method thereof will be described hereinbelow. The unit of the SP value is $(J/cm^3)^{0.5}$, but by using 1 $(cal/cm^3)^{0.5} = 2.045 \times 10^3$ $(J/cm^3)^{0.5}$, it can be converted to $(cal/cm^3)^{0.5}$.

The first resin preferably has a second monomer unit, which is different from the first monomer unit and is at least one selected from the group consisting of monomer units represented by following formulas (2) and (3). Further, where the SP value of the second monomer unit is denoted by $SP_2$ $(J/cm^3)^{0.5}$, it is preferable that the following relational formula (4) be satisfied. It is more preferable that the following formula (4') be satisfied. The upper limit of $SP_2$ is not particularly limited but is preferably 30.00 or less.

$$21.00 \ (J/cm^3)^{0.5} \leq SP_2 \quad (4)$$

$$25.00 \ (J/cm^3)^{0.5} \leq SP_2 \quad (4')$$

Where $SP_2$ of the second monomer unit satisfies the formula (4), the second monomer unit becomes highly polar, and a difference in polarity occurs between the first and second monomer units. Due to this difference in polarity, the crystallization of the first monomer unit is promoted, so that excellent low-temperature fixability can be obtained. Specifically, the first monomer unit is incorporated in the crystalline resin, and the first monomer units are aggregated to develop crystallinity.

Normally, the crystallization of the first monomer unit is inhibited when another monomer unit is incorporated, so the crystallinity of a crystalline resin is unlikely to develop. However, it is conceivable that by setting $SP_1$ of the first monomer unit and $SP_2$ of the second monomer unit in the above-mentioned ranges, the first monomer unit and the second monomer unit can form a clear phase separation state without being compatible with each other in the first resin, and the melting point can be easily maintained without lowering the crystallinity.

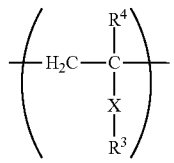

(2)

(In the formula (2), X represents a single bond or an alkylene group having from 1 to 6 carbon atoms.

$R^3$ is —C≡N,

—C(=O)NHR$^{10}$ ($R^{10}$ represents a hydrogen atom or an alkyl group having from 1 to 4 carbon atoms), a hydroxy group, —COOR$^{31}$ ($R^{31}$ represents a hydrogen atom, an alkyl group having from 1 to 6 (preferably 1 to 4) carbon atoms or a hydroxyalkyl group having from 1 to 6 (preferably from 1 to 4) carbon atoms), —NH—C(=O)—N($R^{33}$)$_2$ (two $R^{33}$s independently represent a hydrogen atom or an alkyl group having from 1 to 6 (preferably from 1 to 4) carbon atoms), —COO(CH$_2$)$_2$NHCOOR$^{34}$ ($R^{34}$ represents an alkyl group having from 1 to 4 carbon atoms), or —COO(CH$_2$)$_2$—NH—C(=O)—N($R^{35}$)$_2$ (two $R^{35}$s independently represent a hydrogen atom or an alkyl group having from 1 to 6 (preferably from 1 to 4) carbon atoms.

$R^4$ represents a hydrogen atom or a methyl group.)

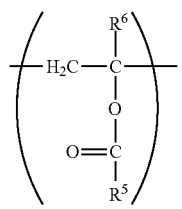

(3)

(In the formula (3), $R^5$ represents an alkyl group having from 1 to 4 carbon atoms, and $R^6$ represents a hydrogen atom or a methyl group.)

Specific examples of the second polymerizable monomer forming the second monomer unit include the polymerizable monomers listed below. Preferably, a polymerizable monomer capable of forming a monomer unit represented by the formula (2) or (3) is used.

A monomer having a nitrile group; for example, acrylonitrile, methacrylonitrile, and the like.

A monomer having a hydroxy group; for example, 2-hydroxyethyl (meth)acrylate, 2-hydroxypropyl (meth)acrylate, and the like.

A monomer having an amide group; for example, acrylamide and a monomer obtained by reacting an amine having from 1 to 30 carbon atoms and a carboxylic acid having from 2 to 30 carbon atoms and an ethylenically unsaturated bond (acrylic acid, methacrylic acid, and the like) by a known method.

A monomer having a urea group; for example, a monomer obtained by reacting an amine having from 3 to 22 carbon atoms [primary amines (normal butylamine, t-butylamine, propylamine, isopropylamine, and the like), secondary amines (dinormalethylamine, dinormalpropylamine, dinormal butylamine, and the like), aniline, cycloxylamine, and the like] with an isocyanate having from 2 to 30 carbon atoms and an ethylenically unsaturated bond by a known method.

A monomer having a carboxy group; for example, methacrylic acid, acrylic acid, and 2-carboxyethyl (meth)acrylate.

Among them, it is preferable to use a monomer having a nitrile group, an amide group, a hydroxy group, or a urea group. More preferably, a monomer having an ethylenically unsaturated bond and at least one functional group selected from the group consisting of a nitrile group, an amide group, a hydroxy group, and a urea group. Acrylonitrile and methacrylonitrile are particularly preferable.

Further, as the second monomer unit, a vinyl ester such as vinyl acetate, vinyl propionate, vinyl butyrate, vinyl caproate, vinyl caprylate, vinyl decanoate, vinyl laurate, vinyl myristate, vinyl palmitate, vinyl stearate, vinyl pivalate, and vinyl octylate is also preferably used. Among them, since vinyl esters are non-conjugated monomers, which tend to maintain appropriate reactivity with the first polymerizable monomer and easily increase the crystallinity of the polymer, vinyl monomers are preferable from the viewpoint of low-temperature fixability.

The content ratio of the second monomer unit in the first resin is preferably from 5.0% by mass to 40.0% by mass, and more preferably from 7.0% by mass to 30.0% by mass.

The first resin may comprises a third monomer unit obtained by polymerization of a third polymerizable monomer, which is not included in the range of the above formula (4) (that is, different from the first polymerizable monomer and the second polymerizable monomer), within a range in which the mass ratio of the first monomer unit and the second monomer unit described above is not impaired. As the third polymerizable monomer, among the monomers exemplified as the second polymerizable monomer, a monomer that does not satisfy the above formula (4) can be used.

For example, the following monomers can also be used. Styrene and derivatives thereof such as styrene, o-methylstyrene and the like, and (meth)acrylic acid esters such as methyl (meth)acrylate, n-butyl (meth)acrylate, t-butyl (meth)acrylate, 2-ethylhexyl (meth)acrylate. Among them, from the viewpoint of charge diffusion, the third polymerizable monomer is preferably styrene. The content ratio of the third monomer unit in the first resin is preferably from 5.0% by mass to 50.0% by mass, and more preferably from 10.0% by mass to 35.0% by mass.

<Second Resin>

The binder resin includes a second resin, and the second resin is an amorphous resin. As the second resin forming the domains, a known amorphous resin can be used, and from the viewpoint of low-temperature fixability and fixing separability, a polyester resin, a styrene acrylic resin, or a hybrid resin thereof is preferable. As the styrene acrylic resin, a styrene acrylic resin usually used for toner can be preferably used.

The second resin preferably includes a styrene acrylic resin and more preferably is a styrene acrylic resin. The styrene acrylic resin is preferably a copolymer of a styrene-based monomer and a (meth)acrylic-based monomer. The weight average molecular weight (Mw) of the second resin is preferably from 10000 to 100000, and more preferably from 20000 to 60000.

Examples of the styrene-based monomer include styrene, α-methylstyrene, (3-methylstyrene, o-methylstyrene, m-methylstyrene, p-methyl styrene, 2,4-dimethylstyrene, p-n-butylstyrene, p-tert-butyl styrene, p-n-hexyl styrene, p-n-octyl styrene, p-n-nonyl styrene, p-n-decyl styrene, p-n-dodecyl styrene, p-methoxy styrene and p-phenyl styrene. These styrene-based monomers can be used alone or in combination of two or more.

Examples of the (meth)acrylic-based monomer include methyl (meth)acrylate, ethyl (meth)acrylate, n-propyl (meth)acrylate, iso-propyl (meth)acrylate, n-butyl (meth)acrylate, iso-butyl (meth)acrylate, tert-butyl (meth)acrylate, n-amyl (meth)acrylate, n-hexyl (meth)acrylate, 2-ethylhexyl (meth)acrylate, n-octyl (meth)acrylate, n-nonyl (meth)acrylate, cyclohexyl (meth)acrylate, benzyl (meth)acrylate, dimethyl phosphate ethyl (meth)acrylate, diethyl phosphate ethyl (meth)acrylate, dibutyl phosphate ethyl (meth)acrylate, 2-benzoyloxyethyl (meth)acrylate, (meth)acrylonitrile, 2-hydroxyethyl (meth)acrylate, (meth)acrylic acid, and maleic acid. These (meth)acrylic-based monomers can be used alone or in combination of two or more.

As the polyester resin, a polyester resin usually used for toner can be preferably used. Monomers to be used in the polyester resin include polyhydric alcohols (dihydric or trihydric or higher alcohols), polyvalent carboxylic acids (divalent or trivalent or higher carboxylic acids), acid anhydrides thereof or lower alkyl esters thereof.

Examples of the polyhydric alcohols include the following. Examples of the dihydric alcohol include the following bisphenol derivatives. Polyoxypropylene-(2.2)-2,2-bis(4-hydroxyphenyl)propane, polyoxypropylene-(3.3)-2,2-bis(4-hydroxyphenyl)propane, polyoxyethylene-(2.0)-2,2-bis(4-hydroxyphenyl)propane, polyoxypropylene-(2.0)-polyoxyethylene-(2.0)-2,2-bis(4-hydroxyphenyl)-propane, polyoxypropylene-(6)-2,2-bis(4-hydroxyphenyl)propane, and the like.

Examples of other polyhydric alcohols include ethylene glycol, diethylene glycol, triethylene glycol, 1,2-propanediol, 1,3-propanediol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerin, 2-methylpropanetriol, 2-methyl-1,2,4-butanetriol, trimethylolethane, trimethylolpropane, and 1,3,5-trihydroxymethylbenzene. These polyhydric alcohols can be used alone or in combination of two or more.

Examples of the polyvalent carboxylic acid include the following. Examples of the divalent carboxylic acids include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isododecenylsuccinic acid, n-dodecyl succinic acid, isododecylsuccinic acid, n-octenylsuccinic acid, n-octylsuccinic acid, isooctenylsuccinic acid, isooctylsuccinic acid, anhydrides of these acids and lower alkyl esters thereof. Of these, maleic acid, fumaric acid, terephthalic acid, and n-dodecenylsuccinic acid are preferably used.

Examples of the trivalent or higher carboxylic acid, acid anhydrides thereof or lower alkyl esters thereof include the following. 1,2,4-Benzenetricarboxylic acid (trimellitic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxy-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, Empol trimeric acid, acid anhydrides thereof or lower alkyl esters thereof.

Of these, derivatives such as 1,2,4-benzenetricarboxylic acid (trimellitic acid) or an acid anhydride thereof are preferably used because of low cost and easiness of reaction control. These polyvalent carboxylic acids can be used alone or in combination of two or more.

<Other Resins>

For the purpose of improving pigment dispersibility, the binder resin may include a third resin other than the first resin and the second resin to the extent that the effect of the present disclosure is not impaired. Examples of such resin include the following. Polyvinyl chloride, phenol resin, natural resin-modified phenol resin, natural resin-modified maleic acid resin, polyvinyl acetate, silicone resin, polyester resin, polyurethane resin, polyamide resin, furan resin, epoxy resin, xylene resin, polyvinyl butyral, terpene resin, coumarone-indene resin, and petroleum resin.

<Release Agent>

The toner includes a release agent. A release agent optimum for the combination of the first resin and the second resin may be selected and used. It is considered that the release agent moves to the toner particle surface through the first resin at the time of fixing. Therefore, the melting point of the release agent is preferably from the melting point $T_p$ of the first resin to the softening temperature $T_m$ of the second resin. Wax is synonymous with the release agent.

Examples of the release agent (wax) include the following: hydrocarbon waxes such as microcrystalline wax, paraffin wax and Fischer-Tropsch wax; oxides of hydrocarbon waxes, such as polyethylene oxide wax, and block copolymers of these; waxes such as carnauba wax consisting primarily of fatty acid esters; and waxes such as deoxidized carnauba wax consisting of partially or fully deoxidized fatty acid esters.

Other examples include the following: saturated straight-chain fatty acids such as palmitic acid, stearic acid and montanic acid; unsaturated fatty acids such as brassidic acid, eleostearic acid and parinaric acid; saturated alcohols such as stearyl alcohol, aralkyl alcohol, behenyl alcohol, carnaubyl alcohol, ceryl alcohol and melissyl alcohol; polyhydric alcohols such as sorbitol; esters of fatty acids such as palmitic acid, stearic acid, behenic acid and montanic acid with alcohols such as stearyl alcohol, aralkyl alcohol, behenyl alcohol, carnaubyl alcohol, ceryl alcohol and melissyl alcohol; fatty acid amides such as linoleamide, oleamide and lauramide; saturated fatty acid bisamides such as methylene bis stearamide, ethylene bis capramide, ethylene bis lauramide and hexamethylene bis stearamide; unsaturated fatty acid amides such as ethylene bis oleamide, hexamethylene bis oleamide, N,N'-dieoleyl adipamide and N,N'-dioleyl sebacamide; aromatic bisamides such as m-xylene bis stearamide and N,N'-distearyl isophthalamide; aliphatic metal salts (commonly called metal soaps) such as calcium stearate, calcium laurate, zinc stearate and magnesium stearate; waxes obtained by grafting vinyl monomers such as styrene and acrylic acid onto aliphatic hydrocarbon waxes; partial esterification products of polyhydric alcohols and fatty acids, such as behenic acid monoglyceride; and methyl ester compounds having hydroxy groups obtained by hydrogenation of plant-based oils and fats.

The release agent preferably includes a hydrocarbon wax. The wax content is preferably from 2.0 parts by mass to 30.0 parts by mass with respect to 100 parts by mass of the binder resin.

<Colorant>

The toner particle may also comprise a colorant. Examples of colorants include the following.

Examples of black colorants include carbon black and blacks obtained by blending yellow, magenta and cyan colorants. A pigment may be used alone as a colorant, but combining a dye and a pigment to improve the sharpness is desirable from the standpoint of the image quality of full-color images.

Examples of pigments for magenta toners include C.I. pigment red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269 and 282; C.I. pigment violet 19; and C.I. vat red 1, 2, 10, 13, 15, 23, 29 and 35.

Examples of dyes for magenta toners include C.I. solvent red 1, 3, 8, 23, 24, 25, 27, 30, 49, 81, 82, 83, 84, 100, 109 and 121; C.I. disper red 9; C.I. solvent violet 8, 13, 14, 21, 27; oil-soluble dyes such as C.I. disperse violet 1, and C.I. basic red 1, 2, 9, 12, 13, 14, 15, 17, 18, 22, 23, 24, 27, 29, 32, 34, 35, 36, 37, 38, 39 and 40; and basic dyes such as C.I. basic violet 1, 3, 7, 10, 14, 15, 21, 25, 26, 27 and 28.

Examples of pigments for cyan toners include C.I. pigment blue 2, 3, 15:2, 15:3, 15:4, 16, and 17; C. I. vat blue 6; and C.I. acid blue 45 and copper phthalocyanine pigments having 1 to 5 phthalimidomethyl substituents in the phthalocyanine framework. Examples of dyes for cyan toners include C.I. solvent blue 70.

Examples of pigments for yellow toners include C.I. pigment yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181 and 185; and C.I. vat yellow 1, 3 and 20. Examples of dyes for yellow toners include C.I. solvent yellow 162.

These colorants can be used alone or in admixture, and even in the form of a solid solution. The colorant is selected from the viewpoint of hue angle, saturation, lightness, light resistance, OHP transparency, and dispersibility in toner. The content of the colorant is preferably from 0.1 part by mass to 30.0 parts by mass with respect to 100 parts by mass of the binder resin.

<Charge Control Agent>

If necessary, the toner particle may include a charge control agent. By blending a charge control agent, it is possible to stabilize the charge characteristics and control the optimum triboelectric charge quantity according to the developing system. As the charge control agent, known ones can be used, but a metal compound of an aromatic carboxylic acid, which is colorless, has a high charging speed of the toner, and can stably maintain a constant charge quantity, is particularly preferable.

Examples of negative charge control agents include metal compounds of salicylic acid, metal compounds of naphthoic acid, metal compounds of dicarboxylic acids, polymer compounds having a sulfonic acid or a carboxylic acid in a side chain, polymer compounds having a sulfonic acid salt or a sulfonic acid esterification product in a side chain, polymer compounds having a carboxylic acid salt or a carboxylic acid esterification product in a side chain, boron compounds, urea compounds, silicon compounds, and calixarenes.

The charge control agent may be added internally or externally to the toner particle. The content of the charge control agent is preferably from 0.2 parts by mass to 10.0 parts by mass, and more preferably from 0.5 parts by mass to 10.0 parts by mass with respect to 100 parts by mass of the binder resin.

<Inorganic Fine Particles>

If necessary, the toner may include inorganic fine particles. The inorganic fine particles may be internally added to the toner particle or may be mixed with the toner as an external additive. Examples of the inorganic fine particles include fine particles such as silica fine particles, titanium oxide fine particles, alumina fine particles, and complex oxide fine particles thereof. Among the inorganic fine particles, silica fine particles and titanium oxide fine particles are preferable for fluidity improvement and charge homogenization. The inorganic fine particles are preferably hydrophobized with a hydrophobizing agent such as a silane compound, silicone oil or a mixture thereof.

From the viewpoint of improving flowability, the inorganic fine particles as an external additive preferably have a specific surface area of from 50 $m^2/g$ to 400 $m^2/g$. Further, from the viewpoint of improving durability stability, the inorganic fine particles as an external additive preferably have a specific surface area of from 10 $m^2/g$ to 50 $m^2/g$. Inorganic fine particles having a specific surface area in the above ranges may be used in combination in order to achieve both improved flowability and durability stability.

The content of the external additive is preferably from 0.1 part by mass to 10.0 parts by mass with respect to 100 parts by mass of the toner particles. A known mixer such as a Henschel mixer can be used for mixing the toner particles and the external additive.

<Developer>

Although the toner can be used as a one-component developer, it is more preferable to use it as a two-component developer by mixing with a magnetic carrier because a stable image can be obtained for a long period of time.

Examples of the magnetic carrier include generally known materials such as iron powder with oxidized surface, unoxidized iron powder, metal particles such as iron, lithium, calcium, magnesium, nickel, copper, zinc, cobalt, manganese, and rare earth, and alloys thereof, magnetic bodies such as ferrites, magnetic body-dispersed resin carriers (so-called resin carriers) including magnetic bodies and a binder resin that holds the magnetic bodies in a dispersed state, and the like.

Where the toner is mixed with a magnetic carrier and used as a two-component developer, usually good results are obtained when the carrier mixing ratio at that time is preferably from 2.0% by mass to 15.0% by mass, and more preferably from 4.0% by mass to 13.0% by mass as the toner concentration in the two-component developer.

<Toner Manufacturing Method>

The toner manufacturing method is not particularly limited, and a known manufacturing method can be adopted. A melt-kneading and pulverization method is preferable. The melt-kneading and pulverization method includes, for example, a melt-kneading step of melt-kneading a composition including a binder resin and a release agent to obtain a melt-kneaded product, a cooling and solidifying step of cooling and solidifying the melt-kneaded product to obtain a cooled solidified product, and a pulverization step of pulverizing the cooled solidified product to obtain a pulverized product.

With the above manufacturing method, it is easy to apply shear stress to the melt-kneaded product immediately after the matrix-domain structure composed of the matrix including the first resin and the domains including the second resin is formed. For example, when a twin-screw kneader is used in the melt-kneading step, a mechanism for applying shear stress to the discharged melt-kneaded product may be provided.

As the mechanism for applying shear stress to the melt-kneaded product, cooling after rolling or rolling while cooling may be used when cooling and solidifying the melt-kneaded product. As a method for cooling after rolling, a method of rolling with a press roller and then cooling with a steel belt cooler may be used. As a method for rolling while cooling, a method of simultaneously cooling and rolling with a press roller having a cooling mechanism may be used. Rolling makes it easier to align the orientation of the domains and maintain that state by cooling. That is, as a method for producing the toner, it is preferable to roll while cooling when the melt-kneaded product is cooled and solidified.

Further, the first resin and the second resin are preferably used in a combination in which the first resin and the second resin are incompatible when a melt-kneaded product obtained by melt-kneading the first resin and the second resin at 150° C. is observed at 150° C. By using a combination of resins that are incompatible at high temperatures, it becomes easier to apply shear stress and align the orientation of the domains. The observation of the melt-kneaded product at 150° C. is specifically carried out as follows. The melt-kneaded product obtained by melt-kneading the mixture of the first resin and the second resin at 150° C. with a twin-screw kneader is heated to 150° C. on a hot plate and observed. In the observation, when the melt-kneaded product is opaque, it is determined that the two types of resins are incompatible with each other.

Hereinafter, the toner manufacturing procedure in the melt-kneading and pulverization method will be described.

<Raw Material Mixing Step>

In a raw material mixing step, for example, a binder resin, a release agent, and if necessary other components such as a colorant, a charge control agent, and the like are weighed and blended in predetermined amounts as materials constituting the toner particle. Examples of the mixing device include a double-cone mixer, a V-type mixer, a drum-type mixer, a Super mixer, a Henschel mixer, a Nauta mixer, a Mechanohybrid (manufactured by Nippon Coke Industries, Ltd.), and the like.

<Melt-Kneading Step>

Next, the mixed material is melt-kneaded to disperse the release agent and the like in the binder resin. In the melt-kneading step, a batch-type kneader such as a pressurization kneader or a Banbury mixer or a continuous-type kneader can be used, and a single-screw or twin-screw extruder has become the mainstream because of the advantage of continuous production. Examples thereof include a KTK type twin-screw extruder (manufactured by Kobe Steel, Ltd.), a TEM type twin-screw extruder (manufactured by Toshiba Machine Co., Ltd.), a PCM kneader (manufactured by Ikegai Iron Works Co., Ltd.), a twin-screw extruder (manufactured by Kabushiki Kaisha KCK), a co-kneader (manufactured by Buss AG), Kneedex (manufactured by Nippon Coke Industries Co., Ltd.), and the like. Further, the resin composition obtained by melt-kneading may be rolled with two rolls or the like and cooled with water or the like in the cooling step.

In particular, it is preferable to roll the resin composition after melt-kneading and then rapidly cool the resin composition immediately thereafter, because it becomes easy to control the degree of orientation of the domains within the above-mentioned specific range. Examples of suitable methods include a method of rolling a resin composition after melt-kneading with a biaxial roller or drum and then cooling with a steel belt cooler (manufactured by Nippon Steel Conveyor Co., Ltd.), and a method of rolling while cooling with a press roller and a drum having a cooling mechanism inside such as a belt drum flaker (manufactured by Nippon Coke Co., Ltd.). In a preferred method, the resin composition after melt-kneading is rolled while being cooled by a press roller and a drum provided with a cooling mechanism inside.

In order to control the orientation of the domains, the melt-kneaded resin composition preferably has a high cooling rate when cooled to the melting point Tp or less of the first resin, and it is preferable that the time until the melt-kneaded resin composition is cooled to the melting point Tp or less of the first resin be short. The time from after melting until the melt-kneaded resin composition is rolled and cooled to reach the melting point Tp or less of the first resin is preferably within 30 sec, more preferably within 20 sec, and further preferably within 15 sec. The cooling rate from rolling to reaching the melting point Tp or less of the first resin is preferably from 3° C./sec to 50° C./sec, more preferably from 4° C./sec to 30° C./sec, and even more preferably from 5° C./sec to 12° C./sec. The dispersed state of the first resin and the second resin, the average major axis of the domains, and the like can be controlled by the kneading temperature of the melt kneading step, the rotation speed of the screw, and the like.

<Pulverization Step>

Then, the cooled product of the resin composition is pulverized to a desired particle diameter in the pulverization step. In the pulverization step, after coarse pulverization with a pulverizer such as a crusher, a hammer mill, or a feather mill, further, fine pulverization is performed with, for example, a Cryptron system (manufactured by Kawasaki Heavy Industries, Ltd.), a SuperRotor (manufactured by Nisshin Engineering Co., Ltd.), a turbo mill (manufactured by Turbo Industries Co., Ltd.) or an air jet system.

<Classification Step>

After that, if necessary, classification is performed with a classifier or sieve such as inertial classification type Elbow Jet (manufactured by Nittetsu Mining Co., Ltd.), centrifugal force classification type Turboplex (manufactured by Hosokawa Micron Corporation), TSP separator (manufactured by Hosokawa Micron Corporation), Faculty (manufactured by Hosokawa Micron Corporation), and the like.

<External Addition Step>

The obtained toner particles may be used as they are as a toner. If necessary, the toner particle surface may be externally treated with an external additive to obtain toner. As a method for externally adding an external additive, predetermined amounts of classified toner and various known external additives are blended and then stirred and mixed by using a mixing device such as a double-cone mixer, a V-type mixer, a drum-type mixer, SuperMixer, a Henschel mixer, a Nauta mixer, Mechanohybrid (manufactured by Nippon Coke Industries Co., Ltd.), Nobilta (manufactured by Hosokawa Micron Corporation), and the like as an external mixer.

<Evaluation of Domain-Matrix Structure by Cross-Sectional Observation of Toner>

Sections are first prepared as reference samples of abundance. The first resin (crystalline resin) is first thoroughly dispersed in a visible light curable resin (Aronix LCR Series D800) and cured by exposure to short wavelength light. The resulting cured resin is cut with an ultramicrotome equipped with a diamond knife to prepare a 250 nm sample section. A sample of the second resin (amorphous resin) is prepared in the same way.

The first resin and second resin are mixed at ratios of 30/70 and 70/30, and melt kneaded to prepare kneaded mixtures. These are similarly dispersed in visible light curable resin and cut to prepare sample sections.

Next, these reference samples are observed in cross-section by TEM-EDX using a transmission electron microscope (JEOL Ltd., JEM-2800 electron microscope), and element mapping is performed by EDX. The mapped elements are carbon, oxygen and nitrogen. The mapping conditions are as follows.

Acceleration voltage: 200 kV
Electron beam exposure size: 1.5 nm
Live time limit: 600 sec
Dead time: 20 to 30
Mapping resolution: 256×256

(Oxygen element intensity/carbon element intensity) and (nitrogen element intensity/carbon element intensity) are calculated based on the spectral intensities of each element (average in 10 nm-square area), and calibration curves are prepared for the mass ratios of the first and second resin. When the monomer units of the first resin contain nitrogen, the subsequent assay is performed using the (nitrogen element intensity/carbon element intensity) calibration curve.

The toner samples are then analyzed. The toner is first thoroughly dispersed in a visible light curable resin (Aronix LCR Series D800) and cured by exposure to short wavelength light. The resulting cured resin is cut with an ultramicrotome equipped with a diamond knife to prepare a 250 nm sample section. The cut sample is then observed by TEM-EDX using a transmission electron microscope (JEOL Ltd., JEM-2800 electron microscope). A cross-sectional image of the toner particle is obtained, and element mapping is performed by EDX. The mapped elements are carbon, oxygen and nitrogen.

Toner particle cross-sections for observation are selected as follows. The cross-sectional area of the toner particle is first determined from the cross-sectional image, and the diameter of a circle having the same area as the cross-sectional area (circle equivalent diameter) is determined. Observation is limited to toner particle cross-section images in which the absolute value of the difference between the circle equivalent diameter and the weight-average particle diameter (D4) is within 1.0 μm. For the domains confirmed in the observed image, (oxygen element intensity/carbon element intensity) and/or (nitrogen element intensity/carbon element intensity) are calculated based on the spectrum intensities of each element (average of 10 nm square), and the ratios of the first and second resins are calculated based on a comparison with the calibration curves. A domain in which the ratio of the second resin is at least 80% is considered a domain in the present disclosure.

When the ratio of the toner particle cross section forming the matrix-domain structure in the toner particle cross section is 80% by number or more, it is determined that the toner particle cross section has the matrix-domain structure in the toner to be measured. The matrix-domain structure is a state in which domains that are a discontinuous phase are dispersed in a matrix that is a continuous phase. Here, it is determined that the first resin or the second resin is the continuous phase when 90 area % or more of the area of the first resin or the area occupied by the second resin in the toner particle cross section is present as one continuous region.

After identifying the domain confirmed by the observation image, binarization processing is performed. By analyzing the binarized image, the domain major axis La present in the cross-sectional image of the toner particle, the angle of the longitudinal direction of the domain, and the maximum length Lb in the direction perpendicular to the major axis La of the domain are obtained. The measurements are performed at 10 points per one toner particle, and the arithmetic average value of the domain major axis La of 10 toner particles is defined as the average major axis (μm) of the domains. The longitudinal direction of the domain is the longest direction of the domain. That is, it is the direction of a line segment forming the major axis La.

Meanwhile, the standard deviation of the angle of the longitudinal direction of domains is calculated by the following method. First, an arbitrary reference axis (vertical axis or horizontal axis of a SEM micrograph) is set, and the value of an angle formed by the reference axis and the longitudinal direction of each domain is measured for 10 domains in one toner particle. This is the angle of the longitudinal direction of domains. The average value of the angles of the longitudinal direction of 10 domains measured for each toner particle is obtained, and the angle obtained by subtracting the average value from the measured value is determined. This operation is performed on 10 toner particles, the standard deviation is calculated based on the 100 angle data, and the result is used as the standard deviation of the angle of the longitudinal direction of domains. Further, the value of La/Lb is calculated for each domain, and the arithmetic average for 100 domains is defined as La/Lb of the toner particle.

Meanwhile, for the domain area, the total area is found by summing up the areas of all the domains present in the cross-sectional image of one toner particle, and the total area is denoted by S1. The total area of the domains of 100 toner particles (that is, S1+S2+ . . . S100) is calculated, and the arithmetic average value of 100 particles is defined as "domain area".

For the area of the cross section of toner particles, the total cross-sectional area of toner particles (for 100 toner particles) obtained from the toner cross section image used when determining the domain area is obtained, and the arithmetic average value thereof is calculated as "total area of toner particle cross section". Further, "total area of toner particle cross section"–"domain area" is defined as "matrix area". "Matrix area"/"total area of toner particle cross section"×100 is defined as the area ratio of the matrix in the total area of the toner particle cross section (matrix area ratio (%)). Image processing software "ImageJ" is used for the binarization processing and the calculation of the average major axis of domains and the standard deviation of the angle of the longitudinal direction of domains.

In the image processing software, the major axis La can be selected by Analyze menu>Analyze Particles>Fit Ellipse>Major. The maximum length Lb can be selected by the Analyze menu>Analyze Particles>Fit Ellipse>Minor, and the angle of the longitudinal direction can be selected by the Analyze menu>Analyze Particles>Fit Ellipse>Ma Angle.

<Method for Separating Materials from Toner>

Each of the materials contained in the toner can be separated from the toner using the differences among the materials in solubility in solvents.

First separation: The toner is dissolved in 23° C. methyl ethyl ketone (MEK), and the soluble component (second resin) is separated from the insoluble components (first resin, release agent, colorant, inorganic fine particle, etc.).

Second separation: The insoluble components obtained in the first separation (first resin, release agent, colorant, inorganic fine particle, etc.) are dissolved in 100° C. MEK, and the soluble components (first resin, release agent) are separated from the insoluble components (colorant, inorganic fine particle, etc.).

Third separation: The soluble components (first resin, release agent) obtained in the second separation are dissolved in 23° C. chloroform and separated into a soluble component (first resin) and an insoluble component (release agent).

(When a Third Resin is Included)

First separation: The toner is dissolved in 23° C. methyl ethyl ketone (MEK), and the soluble components (second resin, third resin) are separated from the insoluble components (first resin, release agent, colorant, inorganic fine particle, etc.).

Second separation: The soluble components (second resin, third resin) obtained in the first separation are dissolved in 23° C. toluene and separated into a soluble component (third resin) and an insoluble component (second resin).

Third separation: The insoluble components (first resin, release agent, colorant, inorganic fine particle, etc.) obtained in the first separation are dissolved in 100° C. MEK and separated into soluble components (first resin, release agent) and insoluble components (colorant, inorganic fine particle, etc.).

Fourth separation: The soluble components (first resin, release agent) obtained in the third separation are dissolved in 23° C. chloroform and separated into a soluble component (first resin) and an insoluble component (release agent).

(Measuring Contents of First Resin and Second Resin in Binder Resin in Toner)

The masses of the soluble components and insoluble components obtained in the separation steps above are measured to calculate the contents of the first resin and second resin in the binder resin in the toner.

Further, a known method such as $^1$H-NMR can be adopted to specify the structure of the first resin or the like separated from the toner.

<Method for Calculating SP Value>

SP Value is determined as follows following the calculation methods proposed by Fedors. The evaporation energy ($\Delta$ei) (cal/mol) and molar volume ($\Delta$vi) (cm$^3$/mol) are determined from the tables described in "Polym. Eng. Sci., 14(2), 147-154 (1974)" for the atoms or atomic groups in the molecular structures of each of the polymerizable monomers, and $(4.184 \times \Sigma \Delta ei/\Sigma \Delta vi)^{0.5}$ is regarded as the SP value $(J/cm^3)^{0.5}$.

SP Value of the monomer unit is calculated by similar methods for the atoms or atomic groups in the molecular structures of the same polymerizable monomers with the double bonds cleaved by polymerization.

<Method for Measuring Weight Average Molecular Weight (Mw) of Resin or the Like Using Gel Permeation Chromatography (GPC)>

The weight average molecular weight (Mw) of a tetrahydrofuran (THF) soluble component such as a resin is measured by gel permeation chromatography (GPC) as follows.

First, the sample such as resin is dissolved in tetrahydrofuran (THF) over the course of 24 hours at room temperature. The resulting solution is filtered through a solvent-resistant membrane filter (Maishori Disk, Tosoh Corp.) having a pore diameter of 0.2 μm to obtain a sample solution. The concentration of THF-soluble components in the sample solution is adjusted to about 0.8 mass %. Measurement is performed under the following conditions using this sample solution.

System: HLC8120 GPC (detector: RI) (Tosoh Corp.)
Columns: Shodex KF-801, 802, 803, 804, 805, 806, 807 (total 7) (Showa Denko)
Eluent: Tetrahydrofuran (THF)
Flow rate: 1.0 mL/min
Oven temperature: 40.0° C.
Sample injection volume: 0.10 mL A molecular weight calibration curve prepared using standard polystyrene resin (product name: TSK standard polystyrene F-850, F-450, F-288, F-128, F-80, F-40, F-20, F-10, F-4, F-2, F-1, A-5000, A-2500, A-1000, A-500, Tosoh Corp.) is used for calculating the molecular weights of the samples.

<Method for Measuring Melting Point, Endothermic Peak and Endothermic Quantity of Resin and the Like>

The melting point, endothermic peak and endothermic quantity of a resin and the like are measured using DSC Q1000 (manufactured by TA Instruments) under the following conditions.

Ramp rate: 10° C./min
Measurement start temperature: 20° C.
Measurement end temperature: 180° C.

The melting points of indium and zinc are used for temperature correction of the device detection part, and the heat of fusion of indium is used for correction of the calorific value. Specifically, 5 mg of sample is weighed precisely into an aluminum pan, and subjected to differential scanning calorimetry. An empty silver pan is used for reference. The peak temperature of the maximum endothermic peak during the first temperature rise is regarded as the melting point. When multiple peaks are present, the maximum endothermic peak is the peak at which the endothermic quantity is the greatest. Furthermore, the endothermic quantity of the maximum endothermic peak is determined.

<Method for Measuring Softening Temperature (Tm) of Resin>

The softening temperature of the resin is measured using a constant load extrusion type capillary rheometer (Shimadzu Corporation, CFT-500D Flowtester flow characteristics evaluation device) in accordance with the attached manual. With this device, the temperature of a measurement sample packed in a cylinder is raised to melt the sample while a fixed load is applied to the measurement sample from above with a piston, the melted measurement sample is extruded through a die at the bottom of the cylinder, and a flow curve can then be obtained showing the relationship between the temperature and the descent of the piston during this process. The "melting temperature by ½ method" as described in the attached manual of the CFT-500D Flowtester flow characteristics evaluation device is given as the softening temperature.

The melting temperature by the ½ method is calculated as follows.

Half of the difference between the descent of the piston upon completion of outflow (outflow end point, given as "Smax") and the descent of piston at the beginning of outflow (minimum point, given as "Smin") is determined and given as X (X=(Smax−Smin)/2). The temperature in the flow curve at which the descent of the piston is the sum of X and Smin is the melting temperature by the ½ method.

For the measurement sample, about 1.0 g of resin is compression molded for about 60 seconds at about 10 MPa with a tablet molding compressor (such as NPa Systems Co., Ltd., NT-100H) in a 25° C. environment to obtain a cylindrical sample about 8 mm in diameter.

The specific operations for measurement are performed in accordance with the device manual.

The CFT-500D measurement conditions are as follows.
Test mode: Temperature increase method
Initial temperature: 50° C.
Achieved temperature: 200° C.
Measurement interval: 1.0° C.
Ramp rate: 4.0° C./min
Piston cross-sectional area: 1.000 cm$^2$
Test load (piston load): 10.0 kgf/cm$^2$ (0.9807 MPa)
Pre-heating time: 300 seconds
Die hole diameter: 1.0 mm
Die length: 1.0 mm <Method for Measuring Weight-Average Particle Diameter (D4) of Toner Particle>

Using a Multisizer (registered trademark) 3 Coulter Counter precise particle size distribution analyzer (Beckman Coulter, Inc.) based on the pore electrical resistance method and equipped with a 100 μm aperture tube, together with the accessory dedicated Beckman Coulter Multisizer 3 Version 3.51 software (Beckman Coulter, Inc.) for setting measurement conditions and analyzing measurement data, measurement is performed with 25000 effective measurement channels, and the measurement data are analyzed to calculate the weight-average particle diameter (D4) of the toner particle (or toner). The aqueous electrolyte solution used in measurement may be a solution of special grade sodium chloride dissolved in ion-exchanged water to a concentration of about 1 mass %, such as ISOTON II (Beckman Coulter, Inc.) for example. The dedicated software settings are performed as follows prior to measurement and analysis.

On the "Standard measurement method (SOM) changes" screen of the dedicated software, the total count number in control mode is set to 50000 particles, the number of measurements to 1, and the Kd value to a value obtained with "standard particles 10.0 μm" (Beckman Coulter, Inc.). The threshold noise level is set automatically by pushing the "Threshold/Noise Level measurement button". The current is set to 1600 μA, the gain to 2, and the electrolyte solution to ISOTON II, and a check is entered for aperture tube flush after measurement. On the "Conversion settings from pulse to particle diameter" screen of the dedicated software, the bin interval is set to the logarithmic particle diameter, the particle diameter bins to 256, and the particle diameter range to from 2 μm to 60 μm.

The specific measurement methods are as follows.

(1) About 200 mL of the aqueous electrolyte solution is added to a dedicated 250 mL round-bottomed beaker of the Multisizer 3, the beaker is set on the sample stand, and stirring is performed with a stirrer rod counter-clockwise at a rate of 24 rotations/second. Contamination and bubbles in the aperture tube are then removed by the "Aperture tube flush" function of the dedicated software.

(2) 30 mL of the same aqueous electrolyte solution is placed in a glass 100 mL flat-bottomed beaker, and about 0.3 mL of a dilution of "Contaminon N" (a 10 mass % aqueous solution of a pH 7 neutral detergent for washing precision instruments, comprising a nonionic surfactant, an anionic surfactant, and an organic builder, manufactured by Wako Pure Chemical Industries) diluted 3× by mass with ion-exchanged water is added.

(3) A specific amount of ion-exchanged water is placed in the water tank of an ultrasonic disperser (Ultrasonic Dispersion System Tetora 150, Nikkaki Bios) with an electrical output of 120 W equipped with two built-in oscillators having an oscillating frequency of 50 kHz with their phases shifted by 180° from each other, and about 2 mL of the Contaminon N is added to this water tank.

(4) The beaker of (2) above is set in the beaker-fixing hole of the ultrasonic disperser, and the ultrasonic disperser is operated. The height position of the beaker is adjusted so as to maximize the resonant condition of the liquid surface of the aqueous electrolyte solution in the beaker.

(5) The aqueous electrolyte solution in the beaker of (4) is exposed to ultrasound as about 10 mg of toner (particle) is added bit by bit to the aqueous electrolyte solution, and dispersed. Ultrasound dispersion is then continued for a further 60 seconds. During ultrasound dispersion, the water temperature in the tank is adjusted appropriately to from 10° C. to 40° C.

(6) The aqueous electrolyte solution of (5) with the toner (particle) dispersed therein is dripped with a pipette into the round-bottomed beaker of (1) set on the sample stand, and adjusted to a measurement concentration of about 5%. Measurement is then performed until the number of measured particles reaches 50000.

(7) The measurement data is analyzed with the dedicated software attached to the apparatus, and the weight-average particle diameter (D4) is calculated. The weight-average particle diameter (D4) is the "Average diameter" on the "Analysis/volume statistical value (arithmetic mean)" screen when Graph/vol % is set in the dedicated software.

Example

The basic configuration and features of the present invention have been described above, but the invention of the present application will be specifically described below based on examples. However, the present invention is not limited thereto. Unless otherwise specified, parts and % are based on mass.

Production Example of First Resin 1 (Crystalline Resin 1)

| | |
|---|---|
| Solvent: toluene | 100.0 parts |
| Monomer composition | 100.0 parts |

(The Monomer Composition is a Mixture of the Following Behenyl Acrylate, Acrylonitrile and Styrene in the Ratios Shown Below).

| | |
|---|---|
| (Behenyl acrylate | 60.0 parts) |
| (Acrylonitrile | 10.0 parts) |
| (Styrene | 27.5 parts) |
| Polymerization initiator | 0.5 parts |
| [t-Butyl peroxypivalate (manufactured by NOF Corporation: Perbutyl PV)] | |

The above materials were put into a reaction vessel equipped with a reflux condenser, a stirrer, a thermometer, and a nitrogen introduction tube under a nitrogen atmosphere. The inside of the reaction vessel was heated to 70° C. while stirring at 200 rpm, and a polymerization reaction was carried out for 12 hours to obtain a solution in which the polymer of the monomer composition was dissolved in toluene. Subsequently, after the temperature of the solution was lowered to 25° C., the solution was poured into 1000.0 parts of methanol while stirring to precipitate methanol insolubles. The obtained methanol insolubles were filtered off, further washed with methanol, and then vacuum dried at 40° C. for 24 h to obtain the first resin 1 (crystalline resin 1). The weight average molecular weight (Mw) of the first resin 1 (crystalline resin 1) was 34000, and the melting point (Tp) was 61° C.

When the first resin 1 (crystalline resin 1) was analyzed by NMR, it was found that the first resin included 60.0 parts of a monomer unit derived from behenyl acrylate, 10.0 parts of a monomer unit derived from acrylonitrile, and 27.5 parts of a monomer unit derived from styrene, at a mass ratio. Further, the SP value (unit: $(J/cm^3)^{0.5}$) of the crystalline resin 1 was calculated.

Production Examples of First Resins 2 to 9 (Crystalline Resins 2 to 9)

First resins 2 to 9 (crystalline resins 2 to 9) were obtained by carrying out the reaction in the same manner as in the production example of the first resin 1 (crystalline resin 1), except that the respective monomers and the number of parts by mass were changed as shown in Table 1.

TABLE 1

| Crystalline resin No. | First polymerizable monomer type | parts | Second polymerizable monomer type | parts | Third polymerizable monomer type | parts | Physical properties of crystalline resin SP value | Melting point Tp [° C.] |
|---|---|---|---|---|---|---|---|---|
| 1 | BEA | 60.0 | AN | 10.0 | St | 27.5 | 19.9 | 60.0 |
| 2 | BEA | 60.0 | AA | 10.0 | St | 27.5 | 19.8 | 60.0 |
| 3 | SA  | 60.0 | AN | 10.0 | St | 27.5 | 20.0 | 54.0 |
| 4 | MYA | 60.0 | AN | 10.0 | St | 27.5 | 19.8 | 77.0 |
| 5 | GEA | 60.0 | AN | 10.0 | St | 27.5 | 19.8 | 92.0 |
| 6 | BEA | 60.0 | MN | 15.0 | St | 20.0 | 19.9 | 60.0 |
| 7 | BEA | 60.0 | MN | 12.5 | St | 22.5 | 19.7 | 60.0 |
| 8 | BEA | 60.0 | MN | 10.0 | St | 27.5 | 19.6 | 60.0 |
| 9 | BEA | 60.0 | MN | 7.5  | St | 30.0 | 19.4 | 60.0 |

The abbreviations in Table 1 are as follows. The values in parentheses are the SP value $(J/cm^3)^{0.5}$ when the monomer unit is formed.
BEA: behenyl acrylate (SP value: 18.3)
SA: stearyl acrylate (SP value: 18.4)
MYA: myricyl acrylate (SP value: 18.1)
GEA: geddyl acrylate (tetratriacontyl acrylate) (SP value: 18.0)
AN: acrylonitrile (SP value: 29.4)
AA: acrylic acid (SP value: 28.7)
MN: methacrylonitrile (SP value: 27.5)
St: styrene (SP value: 20.1)

Production Example of First Resin 10 (Crystalline Resin 10)

| | |
|---|---|
| 1,12-Dodecanediol: | 46.5 parts |
| Dodecanedioic acid: | 53.3 parts |
| Tin 2-ethylhexanoate: | 0.5 part |

The above materials were weighed in a reaction vessel equipped with a cooling tube, a stirrer, a nitrogen introduction tube, and a thermocouple. After purging the inside of the flask with nitrogen gas, the temperature was gradually raised while stirring, and the reaction was carried out for 3 h while stirring at a temperature of 140° C. Next, the pressure in the reaction vessel was lowered to 8.3 kPa, and the reaction was carried out for 4 h while maintaining the temperature at 200° C. Then, the inside of the reaction vessel was depressurized to 5 kPa or less and the reaction was carried out at 200° C. for 3 h to obtain a crystalline resin 10.

Production Example of Second Resin 1 (Amorphous Resin 1)

A total of 50.0 parts of xylene was loaded in an autoclave, followed by purging with nitrogen, and the temperature was then raised to 185° C. in a sealed state under stirring. Here, a mixed solution of 80.7 parts of styrene, 17.8 parts of n-butyl acrylate, 1.1 parts of divinylbenzene, 0.5 parts of acrylic acid, 1.5 parts of di-tert-butyl peroxide and 20.0 parts of xylene was continuously added dropwise for 3 h to perform polymerization while controlling the temperature inside the autoclave to 185° C. Further, the polymerization was completed by holding at the same temperature for 1 h, and the solvent was removed to obtain a second resin 1 (amorphous resin 1). The weight average molecular weight (Mw) of the second resin 1 (amorphous resin 1) was 40000, and the softening temperature (Tm) was 100° C.

Production Example of Second Resin 2 (Amorphous Resin 2)

A second resin 2 (amorphous resin 2) was obtained by carrying out the reaction in the same manner as in the production example of the second resin 1 (amorphous resin 1), except that the number of parts of di-tert-butyl peroxide was changed from 1.5 parts to 4.0 parts. The weight average molecular weight (Mw) of the second resin 2 (amorphous resin 2) was 15000, and the softening temperature (Tm) was 70° C.

Production Example of Second Resin 3 (Amorphous Resin 3)

A second resin 3 (amorphous resin 3) was obtained by carrying out the reaction in the same manner as in the production example of the second resin 1 (amorphous resin 1), except that the number of parts of di-tert-butyl peroxide was changed from 1.5 parts to 5.0 parts. The weight average molecular weight (Mw) of the second resin 3 (amorphous resin 3) was 10000, and the softening temperature (Tm) was 65° C.

Production Example of Second Resin 4 (Amorphous Resin 4)

(Formulation of Polyester Resin 1)

| | |
|---|---|
| Bisphenol A ethylene oxide (2.2 mol adduct) | 50.0 mol parts |
| Bisphenol A propylene oxide (2.2 mol adduct) | 50.0 mol parts |
| Terephthalic acid | 65.0 mol parts |
| Trimellitic acid anhydride | 25.0 mol parts |
| Acrylic acid | 10.0 mol parts |

A total of 90 parts of the mixture of monomers producing the polyester resin 1 was loaded in a 4-necked flask, then a decompression device, a water separation device, a nitrogen gas introduction device, a temperature measuring device and a stirring device were mounted on the flask, and stirring was performed at 160° C. in a nitrogen atmosphere. There, 10 parts of a vinyl-based polymerizable monomer (styrene 81.0 parts, n-butyl acrylate 17.0 parts, acrylic acid 0.9 parts, divinylbenzene 1.1 parts) that produces a vinyl-based resin and 1 part of benzoyl peroxide as a polymerization initiator were added dropwise from the dropping funnel over 4 h, and the reaction was carried out at 160° C. for 5 h. Then, the temperature was raised to 230° C., 0.2 parts of titanium tetrabutoxide was added to the total amount of the monomers producing the polyester resin, and polymerization was carried out until the softening temperature reached 115° C.

After completion of the reaction, the mixture was taken out from the container, cooled and pulverized to obtain a second resin 4 (amorphous resin 4).

Production Example of Toner 1

| | |
|---|---|
| Crystalline resin 1 | 50.0 parts |
| Amorphous resin 1 | 50.0 parts |
| Wax 1 | 5.0 parts |
| (Fischer-Tropsch wax; melting point 90° C.) | |
| Colorant 1 | 9.0 parts |
| (Cyan pigment: Pigment Blue 15:3, manufactured by Dainichiseika Color & Chem MFG Co., Ltd.) | |

The above materials were mixed using a Henschel mixer (FM-75 type, manufactured by Nippon Coke Industries Co., Ltd.) at a rotation speed of 20 $s^{-1}$ and a rotation time of 5 min, and then kneaded with a twin-screw kneader (PCM-30, manufactured by Ikegai Iron Works Co., Ltd.) set to a temperature of 130° C. at a screw rotation speed of 250 rpm and a discharge temperature of 130° C. The obtained kneaded product was rolled while being cooled by a drum flaker (MBD30-30, manufactured by Nippon Coke Co., Ltd.). The temperature of the cooling water was set to 15° C., and the conditions were set so that the thickness of the resin composition after rolling and cooling was 1.0 mm. The time from after melting until the melting point Tp or less of the first resin was reached was (10 sec), and the cooling rate from after rolling until the melting point Tp or less of the first resin was reached was (7° C./sec).

A coarsely pulverized product was obtained by coarse pulverization to 1 mm or less with a hammer mill. The obtained coarsely pulverized product was finely pulverized with a mechanical pulverizer (T-250, manufactured by Freund-Turbo Corporation). Then, classification was performed using Faculty F-300 (manufactured by Hosokawa Micron Corporation) to obtain toner particles 1 having a weight average particle diameter of about 6.0 μm. The operating conditions were a classification rotor rotation speed of 130 $s^{-1}$ and a dispersion rotor rotation speed of 120 $s^{-1}$.

A total of 0.5 parts of hydrophobic silica fine particles with a BET specific surface area of 25 $m^2$/g surface-treated with 4% by mass of hexamethyldisilazane and 0.5 parts of hydrophobic silica fine particles with a BET specific surface area of 100 $m^2$/g surface-treated with 10% by mass of polydimethylsiloxane were added to 100 parts of toner particles 1, and mixing was performed with a Henshell mixer (FM-75 type, manufactured by Nippon Coke Industries Co., Ltd.) at a rotation speed of 30 $s^{-1}$ and a rotation time of 10 min to obtain toner 1. Based on the method described above, the produced toner 1 was cross-sectionally observed, and the domain matrix structure, the average major axis of the domain, the standard deviation of the angle of the longitudinal direction of domains, and La/Lb were evaluated, and the results are shown in Table 3.

Production Examples of Toners 2, 6 to 8, 23 to 28

Toners 2, 6 to 8, 23 to 28 were obtained in the same manner as in the production example of toner 1, except that the first resin and the second resin were changed to the resins shown in Table 2. Table 3 shows the evaluation results of the toners 2, 6 to 8, and 23 to 28.

Production Examples of Toners 3 to 5

Toners 3 to 5 were obtained in the same manner as in the production example of toner 1, except that the cooling water temperature during rolling and cooling was changed to the conditions shown in Table 2. Table 3 shows the evaluation results of the toners 3 to 5.

Production Examples of Toners 9 to 14

Toners 9 to 14 were obtained in the same manner as in the production example of toner 1, except that the ratio of the first resin to the second resin was changed to the conditions shown in Table 2. Table 3 shows the evaluation results of the toners 9 to 14.

Production Examples of Toners 15 and 16

Toners 15 and 16 were obtained in the same manner as in the production example of toner 1, except that the second resin was changed to the resin shown in Table 2 and the wax 1 was changed to the following wax 2.

| | |
|---|---|
| Wax 2 | 5.0 parts |
| (Microcrystalline wax; melting point 65° C.) | |

Table 3 shows the evaluation results of the toners 15 and 16.

Production Examples of Toners 17 to 22

Toners 17 to 22 were obtained in the same manner as in the production example of toner 1, except that the screw rotation speed and the discharge temperature were changed to the conditions shown in Table 2 as the operating conditions of the twin-screw kneader (PCM-30, manufactured by Ikegai Iron Works Co., Ltd.). Table 3 shows the evaluation results of the toners 17 to 22.

TABLE 2

| Toner particle | Crystalline resin | | Amorphous resin | | Wax | | Kneading conditions | | Cooling conditions during rolling | |
|---|---|---|---|---|---|---|---|---|---|---|
| | | | | | | | Discharge temperature | Rotation speed | Cooling water temperature | Cooling rate |
| No. | No. | parts | No. | parts | No. | parts | [° C.] | [rpm] | [° C.] | [° C./sec] |
| 1 | 1 | 50.0 | 1 | 50.0 | 1 | 5.0 | 130 | 250 | 10 | −7 |
| 2 | 2 | 50.0 | 1 | 50.0 | 1 | 5.0 | 130 | 250 | 10 | −7 |
| 3 | 1 | 50.0 | 1 | 50.0 | 1 | 5.0 | 130 | 250 | 5 | −10 |
| 4 | 1 | 50.0 | 1 | 50.0 | 1 | 5.0 | 130 | 250 | 15 | −5 |
| 5 | 1 | 50.0 | 1 | 50.0 | 1 | 5.0 | 130 | 250 | Natural cooling | |

TABLE 2-continued

| Toner particle No. | Crystalline resin No. | parts | Amorphous resin No. | parts | Wax No. | parts | Kneading conditions Discharge temperature [° C.] | Rotation speed [rpm] | Cooling conditions during rolling Cooling water temperature [° C.] | Cooling rate [° C./sec] |
|---|---|---|---|---|---|---|---|---|---|---|
| 6 | 3 | 50.0 | 1 | 50.0 | 1 | 5.0 | 130 | 250 | 10 | −7 |
| 7 | 4 | 50.0 | 1 | 50.0 | 1 | 5.0 | 130 | 250 | 10 | −7 |
| 8 | 5 | 50.0 | 1 | 50.0 | 1 | 5.0 | 130 | 250 | 10 | −7 |
| 9 | 1 | 30.0 | 1 | 70.0 | 1 | 5.0 | 130 | 250 | 10 | −7 |
| 10 | 1 | 35.0 | 1 | 65.0 | 1 | 5.0 | 130 | 250 | 10 | −7 |
| 11 | 1 | 40.0 | 1 | 60.0 | 1 | 5.0 | 130 | 250 | 10 | −7 |
| 12 | 1 | 60.0 | 1 | 40.0 | 1 | 5.0 | 130 | 250 | 10 | −7 |
| 13 | 1 | 70.0 | 1 | 30.0 | 1 | 5.0 | 130 | 250 | 10 | −7 |
| 14 | 1 | 75.0 | 1 | 25.0 | 1 | 5.0 | 130 | 250 | 10 | −7 |
| 15 | 1 | 50.0 | 2 | 50.0 | 2 | 5.0 | 130 | 250 | 10 | −7 |
| 16 | 1 | 50.0 | 3 | 50.0 | 2 | 5.0 | 130 | 250 | 10 | −7 |
| 17 | 1 | 50.0 | 1 | 50.0 | 1 | 5.0 | 100 | 320 | 10 | −7 |
| 18 | 1 | 50.0 | 1 | 50.0 | 1 | 5.0 | 110 | 300 | 10 | −7 |
| 19 | 1 | 50.0 | 1 | 50.0 | 1 | 5.0 | 120 | 270 | 10 | −7 |
| 20 | 1 | 50.0 | 1 | 50.0 | 1 | 5.0 | 140 | 200 | 10 | −7 |
| 21 | 1 | 50.0 | 1 | 50.0 | 1 | 5.0 | 145 | 180 | 10 | −7 |
| 22 | 1 | 50.0 | 1 | 50.0 | 1 | 5.0 | 150 | 140 | 10 | −7 |
| 23 | 6 | 50.0 | 1 | 50.0 | 1 | 5.0 | 130 | 250 | 10 | −7 |
| 24 | 7 | 50.0 | 1 | 50.0 | 1 | 5.0 | 130 | 250 | 10 | −7 |
| 25 | 8 | 50.0 | 1 | 50.0 | 1 | 5.0 | 130 | 250 | 10 | −7 |
| 26 | 9 | 50.0 | 1 | 50.0 | 1 | 5.0 | 130 | 250 | 10 | −7 |
| 27 | 1 | 50.0 | 4 | 50.0 | 1 | 5.0 | 130 | 250 | 10 | −7 |
| 28 | 10 | 50.0 | 1 | 50.0 | 1 | 5.0 | 130 | 250 | 10 | −7 |
| 29 | 1 | 50.0 | 1 | 50.0 | 1 | 5.0 | 130 | 250 | — | — |

The crystalline resin and the amorphous resin used in the toners other than the toner 26 in Table 2 were used in combinations in which the crystalline resin and the amorphous resin were incompatible when the melt-kneaded product melt-kneaded at 150° C. was observed at 150° C.

Production Example of Toner 29

A toner 29 was produced using an emulsification polymerization method. First, each dispersion liquid was produced by the method described below.

Production Example of Crystalline Resin 1 Fine Particle Dispersion Liquid

| Toluene (manufactured by Wako Pure Chemical Industries, Ltd.) | 300 parts |
|---|---|
| Crystalline resin 1 | 100 parts |

The above materials were weighed and mixed and dissolved at 100° C. Separately, 5.0 parts of sodium dodecylbenzenesulfonate and 10.0 parts of sodium laurate were added to 700 parts of ion-exchanged water and dissolved by heating at 100° C. Next, the toluene solution and the aqueous solution were mixed and stirred at 7000 rpm using an ultrafast stirrer T. K. ROBOMIX, manufactured by PRIMIX Corporation). Further, emulsification was performed at a pressure of 200 MPa using a high-pressure impact disperser NANOMIZER (manufactured by Yoshida Kikai Co., Ltd.). Then, toluene was removed using an evaporator, and the concentration was adjusted with ion-exchanged water to obtain an aqueous dispersion liquid (crystalline resin 1 fine particle dispersion liquid) having a concentration of the crystalline resin 1 fine particles of 20% by mass. The 50% particle diameter (D50) of the crystalline resin 1 based on the volume distribution was measured using a dynamic light scattering type particle size distribution meter NANOTRACK UPA-EX150 (manufactured by Nikkiso Co., Ltd.) and found to be 0.40 μm.

Production Example of Amorphous Resin 1 Fine Particle Dispersion Liquid

| Tetrahydrofuran (manufactured by Wako Pure Chemical Industries, Ltd.) | 300 parts |
|---|---|
| Amorphous resin 1 | 100 parts |
| Anionic surfactant NEOGEN RK (manufactured by Dai-ichi Kogyo Seiyaku Co., Ltd.) | 0.5 parts |

The above materials were weighed and mixed and dissolved. Next, 20.0 parts of 1 mol/L ammonia water was added, and stirring was performed at 4000 rpm using the ultrafast stirrer T. K. ROBOMIX, manufactured by PRIMIX Corporation). Further, 700 parts of ion-exchanged water was added at a rate of 8 g/min to precipitate amorphous resin 1 fine particles. Then, tetrahydrofuran was removed using an evaporator, and the concentration was adjusted with ion-exchanged water to obtain an aqueous dispersion liquid (amorphous resin 1 fine particle dispersion liquid) having a concentration of the amorphous resin 1 fine particles of 20% by mass. The 50% particle diameter (D50) based on the volume distribution of the amorphous resin 1 fine particles was 0.14 μm.

Production Example of Wax Fine Particle Dispersion Liquid

| | |
|---|---|
| Wax 1 | 100.0 parts |
| (Fischer-Tropsch wax; peak temperature of maximum endothermic peak 90° C.) | |
| Anionic surfactant NEOGEN RK (manufactured by Dai-ichi Kogyo Seiyaku Co., Ltd.) | 5 parts |
| Ion-exchanged water | 395 parts |

The above materials were weighed, placed in a mixing container equipped with a stirrer, heated to 90° C., circulated to CLEAREMIX W-MOTION (manufactured by M-Technique Co., Ltd.), and subjected to dispersion treatment for 60 min. The conditions for the dispersion treatment were as follows.

Rotor outer diameter: 3 cm
Clearance: 0.3 mm
Rotor rotation speed: 19000 r/min
Screen rotation speed: 19000 r/min After the dispersion treatment, cooling to 40° C. was performed under the cooling conditions of a rotor rotation speed of 1000 r/min, a screen rotation speed of 0 r/min, and a cooling speed of 10° C./min to obtain an aqueous dispersion liquid (wax fine particle dispersion liquid) having a concentration of wax fine particles of 20% by mass. The 50% particle diameter (D50) of the wax fine particles based on the volume distribution was measured using a dynamic light scattering type particle side distribution meter NANOTRACK UPA-EX150 (manufactured by Nikkiso Co., Ltd.) and found to be 0.15 μm.

Production Example of Colorant Fine Particle Dispersion Liquid

| | |
|---|---|
| Colorant 1 | 50.0 parts |
| (Cyan pigment: Pigment Blue 15:3, manufactured by Dainichiseika Color & Chem MFG Co., Ltd.) | |
| Anionic surfactant NEOGEN RK (manufactured by Dai-ichi Kogyo Seiyaku Co., Ltd.) | 7.5 parts |
| Ion-exchanged water | 442.5 parts |

The above materials were weighed, mixed, dissolved, and dispersed for about 1 h using a high-pressure impact disperser NANOMIZER (manufactured by Yoshida Kikai Co., Ltd.) to obtain an aqueous dispersion liquid (colorant fine particle dispersion liquid) in which the colorant was dispersed and which had a concentration of colorant fine particles of 10% by mass. The 50% particle diameter (D50) based on the volume distribution of the colorant fine particles was measured using a dynamic light scattering type particle side distribution meter NANOTRACK UPA-EX150 (manufactured by Nikkiso Co., Ltd.) and found to be 0.20 μm.

Toner particles were produced by the following method using each dispersion liquid produced by the above method.

Production Example of Toner Particles

| | |
|---|---|
| Crystalline resin 1 fine particle dispersion liquid | 50.0 parts |
| Amorphous resin 1 fine particle dispersion liquid | 50.0 parts |
| Wax fine particle dispersion liquid | 5.0 parts |
| Colorant fine particle dispersion liquid | 9.0 parts |
| Ion-exchanged water | 20.0 parts |
| Crystalline resin 1 fine particle dispersion liquid for post-treatment | 3.0 parts |

The materials other than the above-mentioned crystalline resin 1 fine particle dispersion liquid for post-treatment were put into a round stainless steel flask and mixed. Subsequently, a homogenizer ULTRA-TURRAX T50 (manufactured by IKA Works Inc.) was used to disperse at 5000 r/min for 10 min. After adding a 1.0% aqueous nitric acid solution and adjusting the pH to 3.0, a stirring blade was used in a water bath for heating and heating to 58° C. was performed while adjusting, as appropriate, the number of revolutions at which the mixed solution was stirred. The formed aggregated particles were confirmed, as appropriate, using Coulter Multisizer III and held until the weight average particle diameter (D4) became about 6.4 Then, the crystalline resin 1 fine particle dispersion for post-treatment was added, followed by holding for another 30 min, and then the pH was adjusted to 9.0 using a 5% aqueous sodium hydroxide solution.

After that, heating to 75° C. was performed while continuing stirring. Then, the agglomerated particles were fused by holding at 75° C. for 1 h. Then, crystallization of the resin was promoted by cooling to 50° C. and holding for 3 h. Then, after cooling to 25° C., filtering, and solid-liquid separating, thorough washing with ion-exchanged water and drying were performed to obtain toner particles 29. The toner particles 29 were subjected to the same external addition treatment as the toner 1, to obtain a toner 29. The weight average particle diameter (D4) of the toner 29 was about 6.0 μm.

Table 3 shows the evaluation results of the toner 29.

TABLE 3

Analysis of toner cross section

| Toner particle No. | Matrix-domain structure | Resin of matrix portion | Surface area ratio of matrix [%] | Average diameter of domains in longitudinal direction [nm] | Standard deviation of domain angle [°] | La/Lb |
|---|---|---|---|---|---|---|
| 1 | Present | Crystalline resin | 50 | 200 | 20 | 1.8 |
| 2 | Present | Crystalline resin | 50 | 200 | 20 | 3.0 |
| 3 | Present | Crystalline resin | 50 | 200 | 15 | 1.8 |
| 4 | Present | Crystalline resin | 50 | 200 | 25 | 1.8 |
| 5 | Present | Crystalline resin | 50 | 200 | 35 | 1.8 |
| 6 | Present | Crystalline resin | 50 | 200 | 20 | 1.2 |
| 7 | Present | Crystalline resin | 50 | 200 | 20 | 3.5 |
| 8 | Present | Crystalline resin | 50 | 200 | 20 | 4.5 |
| 9 | Present | Amorphous resin | 70 | 200 | 20 | 1.8 |
| 10 | Present | Crystalline resin | 35 | 200 | 20 | 1.8 |
| 11 | Present | Crystalline resin | 40 | 200 | 20 | 1.8 |
| 12 | Present | Crystalline resin | 60 | 200 | 20 | 1.8 |
| 13 | Present | Crystalline resin | 70 | 200 | 20 | 1.8 |
| 14 | Present | Crystalline resin | 75 | 200 | 20 | 1.8 |
| 15 | Present | Crystalline resin | 50 | 200 | 20 | 1.8 |
| 16 | Present | Crystalline resin | 50 | 200 | 20 | 1.8 |
| 17 | Present | Crystalline resin | 50 | 10 | 20 | 1.8 |
| 18 | Present | Crystalline resin | 50 | 20 | 20 | 1.8 |
| 19 | Present | Crystalline resin | 50 | 100 | 20 | 1.8 |
| 20 | Present | Crystalline resin | 50 | 400 | 20 | 1.8 |
| 21 | Present | Crystalline resin | 50 | 500 | 20 | 1.8 |
| 22 | Present | Crystalline resin | 50 | 600 | 20 | 1.8 |

TABLE 3-continued

Analysis of toner cross section

| Toner particle No. | Matrix-domain structure | Resin of matrix portion | Surface area ratio of matrix [%] | Average diameter of domains in longitudinal direction [nm] | Standard deviation of domain angle [°] | La/Lb |
|---|---|---|---|---|---|---|
| 23 | Present | Crystalline resin | 50 | 200 | 20 | 2.5 |
| 24 | Present | Crystalline resin | 50 | 200 | 20 | 5.0 |
| 25 | Present | Crystalline resin | 50 | 200 | 20 | 7.0 |
| 26 | Present | Crystalline resin | 50 | 200 | 20 | 8.5 |
| 27 | Present | Crystalline resin | 50 | 200 | 20 | 1.8 |
| 28 | Present | Crystalline resin | 50 | 200 | 20 | 1.8 |
| 29 | Present | Crystalline resin | 50 | 200 | 55 | 1.1 |

The area ratio of the matrix of the toner particle 9 is the area ratio when the matrix is an amorphous resin. "Standard deviation of domain angle" indicates the standard deviation of the angle of the longitudinal direction of domains.

Manufacturing Example of Magnetic Carrier 1

Magnetite 1 with number-average particle diameter of 0.30 μm (magnetization strength 65 $Am^2/kg$ in 1000/4π (kA/m) magnetic field)

Magnetite 2 with number-average particle diameter of 0.50 μm (magnetization strength 65 $Am^2/kg$ in 1000/4π (kA/m) magnetic field)

4.0 parts of a silane compound (3-(2-aminoethylamino-propyl)trimethoxysilane) were added to 100 parts each of the above materials, and mixed and stirred at high speed at 100° C. or more in a vessel to treat the respective fine particles.

Phenol: 10 mass %
Formaldehyde solution: 6 mass %
(formaldehyde 40 mass %, methanol 10 mass %, water 50 mass %)
Magnetite 1 treated with silane compound: 58 mass %
Magnetite 2 treated with silane compound: 26 mass %

100 parts of these materials, 5 parts of 28 mass % aqueous ammonia solution and 20 parts of water were placed in a flask, and stirred and mixed as the temperature was raised to 85° C. for 30 minutes, and maintained for 3 hours to perform a polymerization reaction, and the resulting phenol resin was hardened.

The hardened phenol resin was then cooled to 30° C., water was added, the supernatant was removed, and the precipitate was water washed and air dried. This was then dried at 60° C. under reduced pressure (5 mmHg or less) to obtain a magnetic dispersion-type spherical magnetic carrier 1. The volume-based 50% particle diameter (D50) of magnetic carrier 1 was 34.2 μm.

Production Example of Two-Component Developer 1

A total of 8.0 parts of toner 1 was added to 92.0 parts of the magnetic carrier 1 and mixing was performed with a V-type mixer (V-20, manufactured by Seishin Enterprise Co., Ltd.) to obtain a two-component developer 1.

Production Example of Two-Component Developers 2 to 29

Two-component developers 2 to 29 were obtained in the same manner as in the production example of the two-component developer 1, except that the toner 1 was changed to the toners 2 to 29, respectively.

Example 1

Evaluation was performed using the two-component developer 1. As an image forming apparatus, a modified Canon printer imageRUNNER ADVANCE C5560 for digital commercial printing was used, and the two-component developer 1 was put into a cyan developing device. The printer was modified so that the fixing temperature, the process speed, the DC voltage VDC of the developer bearing member, the charging voltage VD of the electrostatic latent image bearing member, and the laser power could be freely set. In the image output evaluation, an FFh image (solid image) having a desired image ratio was output, the VDC, VD, and laser power were adjusted to obtain the desired toner laid-on level on the FFh image on paper, and the below-described evaluation was performed. FFh is a value in which 256 gradations are displayed in hexadecimal, 00h is the first gradation (white background portion) of 256 gradations, and FFh is the 256th gradation (solid portion) of 256 gradations. The evaluation is based on the following evaluation methods, and the results are shown in Table 4.

<Low-Temperature Fixability>

Paper: GFC-081 (81.0 $g/m^2$)
(Sold by Canon Marketing Japan Inc.)
Toner laid-on level on paper: 0.70 $mg/cm^2$
(Adjusted by the DC Voltage VDC of the Developer Bearing Member, the Charging Voltage VD of the Electrostatic Latent Image Bearing Member, and the Laser Power)
Evaluation image: an image of 2 cm×5 cm placed in the center of the A4 paper
Test environment: low-temperature and low-humidity environment: temperature 15° C./humidity 10% RH (hereinafter "L/L")
Fixing temperature: 140° C.
Process speed: 400 mm/sec The above evaluation image was output, and the low-temperature fixability was evaluated. The value of the image density reduction rate was used as an evaluation index for low-temperature fixability. For the image density reduction rate, first, the image density at the center was measured using an X-Rite color reflection densitometer (500 series: manufactured by X-Rite, Inc.). Next, the fixed image was rubbed (5 reciprocations) with Sylbon paper while applying a load of 4.9 kPa (50 $g/cm^2$) to the portion where the image density was measured, and the image density was measured again. Then, the reduction rate of image density during rubbing was calculated using the following formula. The obtained reduction rate of image density was evaluated according to the following evaluation criteria.

Image density reduction rate=[(image density before rubbing)−(image density after rubbing)]/(image density before rubbing)×100

(Evaluation Criteria)

AA: Image density reduction rate is less than 1.0%
A: Image density reduction rate is 1.0% or more and less than 3.0%
B: Image density reduction rate is 3.0% or more and less than 5.0%
C: Image density reduction rate is 5.0% or more and less than 8.0%
D: Image density reduction rate is 8.0% or more <Fixing Separability>

Paper: CS-052 (52.0 g/m$^2$)
(Sold by Canon Marketing Japan Inc.)

Toner laid-on level on paper: 0.60 mg/cm$^2$ (Adjusted by the DC voltage VDC of the developer bearing member, the charging voltage VD of the electrostatic latent image bearing member, and the laser power)

Evaluation image: an image of 2 cm×20 cm placed at the long end of the A4 paper in the paper passing direction with a margin of 1.5 mm from the tip of the paper Test environment: high-temperature and high-humidity environment: temperature 30° C./humidity 80% RH (hereinafter "H/H")

Fixing temperature: raised by 5° C. from 140° C.

Process speed: 400 mm/sec

The evaluation image was output, and the resistance to wraparound was evaluated according to the following criteria at the maximum fixing temperature at which wraparound did not occur.

(Evaluation Criteria)

AA: 175° C. or higher
A: 165° C. or more and less than 175° C.
B: 155° C. or more and less than 165° C.
C: 145° C. or more and less than 155° C.
D: less than 145° C.

Examples 2 to 24 and Comparative Examples 1 to 5

The evaluation was performed in the same manner as in Example 1 except that the two-component developers 2 to 29 were used instead of the two-component developer 1. The evaluation results are shown in Table 4.

In the Table, "C.E." indicates "Comparative example", and "Temp." indicates "Temperature".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2021-045545, filed Mar. 19, 2021, which is hereby incorporated by reference herein in its entirety.

What is claimed is:

1. A toner comprising a toner particle, comprising:
a binder resin comprising a first resin and a second resin; and
a release agent;
the first resin being a crystalline resin having a melting point Tp of 50 to 90° C.; and
the second resin being an amorphous resin, wherein
a cross section of the toner particle observed by a transmission electron microscope has a matrix-domain structure composed of a matrix comprising the first resin and domains comprising the second resin,
the matrix is 35 to 70 area % of a total area of the cross section of the toner particle, and
where a longest direction of each of the domains is taken as a longitudinal direction and an arbitrary reference axis is set, a standard deviation of an angle of the angles formed by the reference axis and the longitudinal directions of the domains is at most 25°.

2. The toner according to claim 1, wherein a softening temperature Tm of the second resin is higher than Tp of the first resin by at least 10° C.

TABLE 4

|  | Developer No. | Toner No. | Magnetic carrier No. | Low-temperature fixability | | Fixing separability | |
|---|---|---|---|---|---|---|---|
|  |  |  |  | Reduction ratio [%] | Rank | Temp. [° C.] | Rank |
| Example 1 | 1 | 1 | 1 | 0.5 | AA | 170 | A |
| Example 2 | 2 | 2 | 1 | 0.5 | AA | 170 | A |
| Example 3 | 3 | 3 | 1 | 0.5 | AA | 175 | AA |
| Example 4 | 4 | 4 | 1 | 0.5 | AA | 175 | AA |
| Example 5 | 6 | 6 | 1 | 0.5 | AA | 160 | B |
| Example 6 | 7 | 7 | 1 | 4.0 | B | 170 | A |
| Example 7 | 10 | 10 | 1 | 2.0 | A | 160 | B |
| Example 8 | 11 | 11 | 1 | 2.0 | A | 170 | A |
| Example 9 | 12 | 12 | 1 | 0.5 | AA | 160 | B |
| Example 10 | 13 | 13 | 1 | 0.5 | AA | 150 | C |
| Example 11 | 15 | 15 | 1 | 0.5 | AA | 160 | B |
| Example 12 | 16 | 16 | 1 | 0.5 | AA | 150 | C |
| Example 13 | 17 | 17 | 1 | 2.0 | A | 150 | C |
| Example 14 | 18 | 18 | 1 | 2.0 | A | 160 | B |
| Example 15 | 19 | 19 | 1 | 2.0 | A | 170 | A |
| Example 16 | 20 | 20 | 1 | 2.0 | A | 170 | A |
| Example 17 | 21 | 21 | 1 | 4.0 | B | 170 | A |
| Example 18 | 22 | 22 | 1 | 6.0 | C | 170 | A |
| Example 19 | 23 | 23 | 1 | 2.0 | A | 170 | A |
| Example 20 | 24 | 24 | 1 | 2.0 | A | 170 | A |
| Example 21 | 25 | 25 | 1 | 4.0 | B | 160 | B |
| Example 22 | 26 | 26 | 1 | 6.0 | C | 150 | C |
| Example 23 | 27 | 27 | 1 | 2.0 | A | 170 | A |
| Example 24 | 28 | 28 | 1 | 2.0 | A | 170 | A |
| C.E. 1 | 5 | 5 | 1 | 2.0 | A | 140 | D |
| C.E. 2 | 8 | 8 | 1 | 8.0 | D | 170 | A |
| C.E. 3 | 9 | 9 | 1 | 8.0 | D | 160 | B |
| C.E. 4 | 14 | 14 | 1 | 0.5 | AA | 140 | D |
| C.E. 5 | 29 | 29 | 1 | 2.0 | A | 140 | D |

3. The toner according to claim 1, wherein the matrix is at most 60 area % of the total area of the cross section of the toner particle.

4. The toner according to claim 1, wherein in the observation of the cross section of the toner particle, an average length of the domains in the longitudinal direction is 20 to 500 nm.

5. The toner according to claim 1, wherein in the observation of the cross section of the toner, a ratio La/Lb is at most 8.0 where La is a length of the domains in the longitudinal direction and Lb is a maximum length in a direction perpendicular to the longitudinal direction.

6. The toner according to claim 1, wherein the first resin comprises a first monomer unit represented by formula (1)

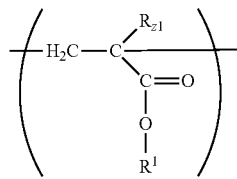

(1)

where $R_{Z1}$ represents a hydrogen atom or a methyl group, and $R^1$ represents an alkyl group having 18 to 36 carbon atoms.

7. The toner according to claim 1, wherein the first resin comprises a vinyl resin, and
the second resin comprises a styrene acrylic resin.

8. The toner according to claim 1, wherein the release agent comprises a hydrocarbon wax.

9. A method for manufacturing the toner according to claim 1, the method comprising:
a step of melt-kneading a composition including the binder resin comprising the first resin, the second resin and the release agent to obtain a melt-kneaded product;
a step of cooling and solidifying the melt-kneaded product to obtain a cooled solidified product, and
a step of pulverizing the cooled solidified product to obtain a pulverized product, wherein
the melt-kneaded product is rolled during the step of cooling and solidifying.

10. The method for manufacturing a toner according to claim 9, wherein the first resin and the second resin are incompatible when observed at 150° C. when the melt-kneaded product was obtained by melt-kneading a mixture comprising the first and second resins at 150° C.

* * * * *